(12) United States Patent
Sano et al.

(10) Patent No.: US 10,909,411 B2
(45) Date of Patent: Feb. 2, 2021

(54) INFORMATION PROCESSING APPARATUS, INFORMATION PROCESSING METHOD, AND COMPUTER PROGRAM PRODUCT

(71) Applicant: Kabushiki Kaisha Toshiba, Minato-ku (JP)

(72) Inventors: Yuma Sano, Setagaya (JP); Tomoki Watanabe, Inagi (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/671,315

(22) Filed: Aug. 8, 2017

(65) Prior Publication Data

US 2018/0189599 A1 Jul. 5, 2018

(30) Foreign Application Priority Data

Jan. 5, 2017 (JP) .................................. 2017-000308

(51) Int. Cl.
*G06K 9/00* (2006.01)
*G06K 9/52* (2006.01)
(Continued)

(52) U.S. Cl.
CPC .............. *G06K 9/52* (2013.01); *B60W 30/08* (2013.01); *G01C 15/00* (2013.01); *G01C 21/3602* (2013.01); *G06K 9/00805* (2013.01); *G06K 9/4604* (2013.01); *G08G 1/165* (2013.01); *G06F 3/147* (2013.01)

(58) Field of Classification Search
CPC ... B60W 30/08; G01C 15/00; G01C 21/3602; G06F 3/147; G06K 9/00805; G06K 9/4604; G06K 9/52; G06T 7/00; G08G 1/165
See application file for complete search history.

(56) References Cited

U.S. PATENT DOCUMENTS 7,298,247 B2 * 11/2007 Shimizu ................. B60Q 9/005
340/435
7,741,961 B1  6/2010 Rafii et al.
(Continued)

FOREIGN PATENT DOCUMENTS

JP 2013-222446 A 10/2013
JP 2016-134090 A 7/2016
(Continued)

OTHER PUBLICATIONS

Ralph Aeschimann, et al., "Ground or Obstacles? Detecting Clear Paths in Vehicle Navigation", IORA, 2015, 8 Pages.
(Continued)

Primary Examiner — Tom Y Lu
(74) Attorney, Agent, or Firm — Oblon, McClelland, Maier & Neustadt, L.L.P.

(57) ABSTRACT

According to an embodiment, an information processing apparatus includes a memory and processing circuitry. The processing circuitry is configured to acquire three-dimensional position information of a detection point, acquire target surface shape information indicating a shape of a target surface, and calculate state information of an object according to a first distance of the detection point from the target surface on the basis of the three-dimensional position information and the target surface shape information.

17 Claims, 12 Drawing Sheets

(51) Int. Cl.
*G06K 9/46* (2006.01)
*G01C 15/00* (2006.01)
*B60W 30/08* (2012.01)
*G01C 21/36* (2006.01)
*G08G 1/16* (2006.01)
*G06F 3/147* (2006.01)

(56) References Cited

U.S. PATENT DOCUMENTS

| | | | | |
|---|---|---|---|---|
| 7,912,583 | B2* | 3/2011 | Gutmann | G06T 7/593 |
| | | | | 700/245 |
| 8,649,557 | B2* | 2/2014 | Hyung | G06T 7/277 |
| | | | | 382/103 |
| 2008/0239076 | A1* | 10/2008 | Luo | G06K 9/00798 |
| | | | | 348/148 |
| 2008/0243383 | A1* | 10/2008 | Lin | G01C 21/165 |
| | | | | 701/469 |
| 2010/0098290 | A1* | 4/2010 | Zhang | G06K 9/00798 |
| | | | | 382/100 |
| 2016/0210735 | A1 | 7/2016 | Fukushima | |
| 2016/0339959 | A1* | 11/2016 | Lee | B60W 30/12 |
| 2017/0057495 | A1* | 3/2017 | Walessa | G01S 7/4808 |
| 2017/0344021 | A1 | 11/2017 | Sano et al. | |
| 2017/0344844 | A1 | 11/2017 | Sano et al. | |
| 2017/0344888 | A1 | 11/2017 | Sano et al. | |
| 2017/0345182 | A1 | 11/2017 | Sano et al. | |
| 2018/0118204 | A1* | 5/2018 | Ito | B60W 30/0956 |

FOREIGN PATENT DOCUMENTS

| | | |
|---|---|---|
| JP | 2017-215939 A | 12/2017 |
| JP | 2017-215940 A | 12/2017 |

OTHER PUBLICATIONS

Jun Miura, et al., "Adaptive Robot Speed Control Considering Map and Motion Uncertainties in Unknown Environments" The Robotics Society of Japan, vol. 24, No. 1, Jan. 15, 2006, pp. 47-55 (with unedited computer generated English translation).

Naoki Suganuma, et al., "Omni-Directional Obstacle Extraction Based on Occupancy Grid Maps for Autonomous Vehicle" Transactions of Society of Automotive Engineers of Japan, [ISSN: 0287-8321], vol. 44, No. 3, May 2003, pp. 967-972 (with English translation).

* cited by examiner

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-000308, filed on Jan. 5, 2017; the entire contents of which are incorporated herein by reference.

FIELD

Embodiments described herein relate generally to an information processing apparatus, an information processing method, and a computer program product.

BACKGROUND

A system that generates an obstacle map on the basis of position information of points acquired using a distance sensor such as a laser sensor is known. There have been some cases where such a system erroneously recognizes a point corresponding to a ground surface as a three-dimensional object, thereby erroneously detecting a region that can actually travel as an obstacle. Accordingly, there is disclosed a system that a point whose distance between the point measured by laser irradiation and an estimated road surface is equal to or less than a threshold value is determined to correspond to a road surface and then removed on the basis of the estimated road surface shape.

Removing the point corresponding to the road surface, however, necessitates another sensor to determine an obstacle in a direction in which the point has been removed. Therefore, in a case where the accuracy of another sensor is low, the reliability of obstacle detection is low accordingly. Conventionally, furthermore, there has been some cases where a point on the road surface is erroneously detected as an obstacle in a case where the accuracy of estimation of the road surface shape is low. Conventionally, therefore, the reliability of object detection has been insufficient.

BRIEF DESCRIPTION OF THE DRAWINGS

FIGS. 11A-1 to 11D-2 are schematic diagrams illustrating existence probabilities.

DETAILED DESCRIPTION

According to an embodiment, an information processing apparatus includes a memory and processing circuitry. The processing circuitry is configured to acquire three-dimensional position information of a detection point, acquire target surface shape information indicating a shape of a target surface, and calculate state information of an object according to a first distance of the detection point from the target surface on the basis of the three-dimensional position information and the target surface shape information.

An information processing apparatus, an information processing method, and a computer program product will be described in detail below with reference to the accompanying drawings.

Figure 1:
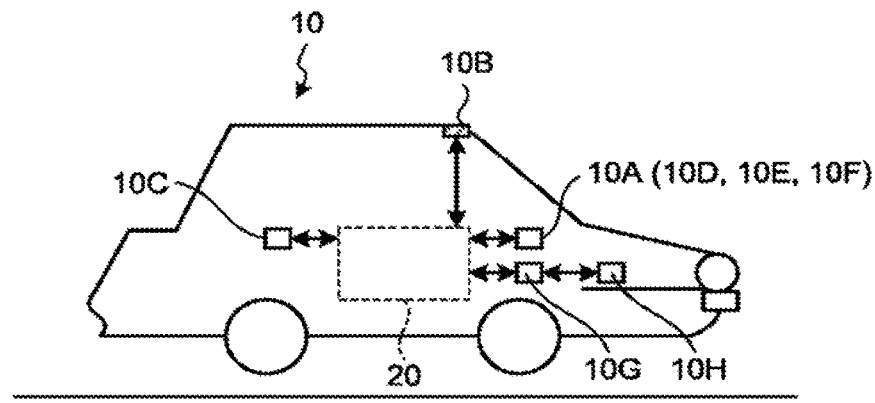
FIG. 1 is a diagram illustrating a mobile object.

FIG. 1 is a diagram illustrating an example of a mobile object 10 according to the present embodiment.

The mobile object 10 includes an information processing apparatus 20, an output unit 10A, an external sensor 10B, an internal sensor 10C, a power control unit 10G, and a power unit 10H.

The information processing apparatus 20 is, for example, a dedicated or general-purpose computer. In the present embodiment, a description will be given of a case, as an example, where the information processing apparatus 20 is mounted in the mobile object 10.

The mobile object 10 is a movable object. The mobile object 10 is a vehicle, a hand truck, an object capable of flying (a manned airplane, an unmanned airplane (e.g., an unmanned aerial vehicle (UAV), a drone), or a robot, for example. Furthermore, the mobile object 10 is a mobile object that travels through driving operation by a human, or a mobile object capable of automatically traveling (autonomously traveling) without driving operation by a human, for example. In the present embodiment, a description will be given of a case, as an example, where the mobile object 10 is a vehicle. The vehicle is a two-wheeled automobile, a three-wheeled automobile, or a four-wheeled automobile, for example. In the present embodiment, a description will be given of a case, as an example, where the vehicle is a four-wheeled automobile capable of autonomously traveling.

Note that the information processing apparatus 20 is not limited to the configuration in which the information processing apparatus 20 is mounted in the mobile object 10. The information processing apparatus 20 may be mounted on a stationary object. The stationary object is an object that is fixed to the ground surface. The stationary object is an unlovable object or an object that is stationary relative to the ground surface. The stationary object is a guardrail, a pole, a parked vehicle, or a road sign, for example. Furthermore, the information processing apparatus 20 may be mounted on a cloud server that executes processing on the cloud.

The power unit 10H is a driving device mounted in the mobile object 10. The power unit 10H is an engine, a motor, or a wheel, for example.

The power control unit 10G controls the power unit 10H. The power unit 10H is driven through the control of the power control unit 10G. To automatically drive the mobile object 10, the power control unit 10G controls the power unit 10H on the basis of information that can be acquired from the external sensor 10B and the internal sensor 10C, and existence probability information derived from processing described later, for example. Through the control of the power unit 10H, the accelerator amount, the brake amount, the steering angle, and the like of the mobile object 10 are controlled. For example, the power control unit 10G controls the vehicle so as to keep traveling in the current lane while avoiding an object such as an obstacle, and keep a predetermined distance or more from a vehicle traveling ahead.

The output unit 10A outputs various kinds of information. In the present embodiment, the output unit 10A outputs the existence probability information derived by the information processing apparatus 20. Note that the existence probability information may be a binary value indicating existence or non-existence. The details of the existence probability information will be described later.

The output unit 10A includes, for example, a communication function that transmits the existence probability information, a display function that displays the existence probability information, and a sound output function that outputs a sound indicating the existence probability information. For example, the output unit 10A includes at least one of a communication unit 10D, a display 10E, and a speaker 10F. Note that the output unit 10A including the communication unit 10D, the display 10E, and the speaker 10F will be described as an example in the present embodiment.

The communication unit 10D transmits the existence probability information to another apparatus. For example, the communication unit 10D transmits the existence probability information to another apparatus via a publicly-known communication line. The display 10E displays the existence probability information. The display 10E is a publicly-known liquid crystal display (LCD), a projection apparatus, or a light, for example. The speaker 10F outputs a sound indicating the existence probability information.

The external sensor 10B is a sensor that recognizes the external world surrounding the mobile object 10. The external sensor 10B may be mounted in the mobile object 10 or may be mounted outside of the mobile object 10. The outside of the mobile object 10 indicates another mobile object or an external apparatus, for example.

The surroundings of the mobile object 10 are a region within a predetermined range from the mobile object 10. This range is an observable range of the external sensor 10B. This range may be set in advance.

The external sensor 10B acquires observation information of the external world. The observation information is information indicating a result of observation of the surroundings of the position in which the external sensor 10B is mounted. In the present embodiment, the observation information is information from which three-dimensional position information of each of a plurality of detection points in the surroundings of the external sensor 10B (i.e., the mobile object 10) can be derived.

The three-dimensional position information of a detection point is information indicating a three-dimensional position of the detection point in a real space. For example, the three-dimensional position information of the detection point is information indicating a distance from the external sensor 10B to the detection point and a direction of the detection point relative to the external sensor 10B as a reference. These distance and direction can be represented by positional coordinates indicating the relative position of the detection point with respect to the external sensor 10B as a reference, positional coordinates indicating the absolute position of the detection point, or vectors, for example. Specifically, the three-dimensional position information is represented by polar coordinates or orthogonal coordinates.

Each detection point indicates an individual point which is individually observed by the external sensor 10B in the external world of the mobile object 10. For example, the external sensor 10B irradiates the surroundings of the external sensor 10B with light and receives reflected light that is reflected off a reflection point. This reflection point corresponds to a detection point. Note that a plurality of reflection points say be used as one detection point.

The external sensor 10B acquires the observation information including a light irradiation direction for each of the plurality of detection points (the directions of the detection points relative to the external sensor 10B as a reference) and information on the reflected light that is reflected off each of the plurality of detection points. The information on the reflected light includes the elapsed time from the light irradiation to the reception of the reflected light and the intensity of the received light (or the attenuation ratio of the intensity of the received light to the intensity of the irradiated light), for example.

Then, the external sensor 10B derives the three-dimensional position information of the detection points by using this elapsed time and the like, and outputs the three-dimensional position information to the information processing apparatus 20. Note that the information processing apparatus 20 may derive the three-dimensional position information of the detection points from the observation information. In the present embodiment, a description will be given of a case where the external sensor 10B outputs the three-dimensional position information of each of the detection points to the information processing apparatus 20.

The external sensor 10B is a photographing apparatus, a distance sensor (a millimeter wave radar, a laser sensor), or a sonar sensor or an ultrasonic sensor that detects an object-using sound waves, for example. The photographing apparatus acquires photographed image data (hereinafter, referred to as a photographed image) by photographing. The photographing apparatus is a stereo camera, a position specifying camera, or the like. The photographed image is digital image data defining a pixel value for each pixel, a depth map defining a distance from the external sensor 10B for each pixel, or the like. The laser sensor is a two-dimensional laser imaging detection and ranging (LIDAR) sensor or a three-dimensional LIDAR sensor, which is mounted parallel to a horizontal plane, for example.

In the present embodiment, a description will be given of a case, as an example, where the external sensor 10B is a photographing apparatus. Note that in a case where the external sensor 10B is a monocular camera, the external sensor 10B may acquire the three-dimensional position information of detection points on the basis of changes of the photographed images corresponding to the movement of the mobile object 10 using Structure from Motion or the like. In addition, in a case where the external sensor 10B is a stereo camera, the external sensor 10B may acquire the three-dimensional position information of detection points using parallax information between cameras.

In the present embodiment, a description will be given of a case, as an example, where the external sensor 10B is mounted such that the photographing direction is the traveling direction of the mobile object 10. In the present embodiment, therefore, a description will be given of a case where the external sensor 10B acquires the three-dimensional position information of each of detection points in the traveling direction (i.e., the front side) of the mobile object 10.

The internal sensor 10C is a sensor that observes the information of the mobile object 10 itself. The internal sensor 10C acquires the three-dimensional position information of the mobile object 10 as well as self position and attitude information that indicates the attitude of the mobile object 10. The internal sensor 10C is an inertial measurement unit (IMU), a speed sensor, or a global positioning system (GPS), for example. The IMU acquires triaxial acceleration, triaxial angular velocity, and the like of the mobile object 10. Note that the three-dimensional position information of the mobile object 10 is represented by world coordinates.

Figure 2:
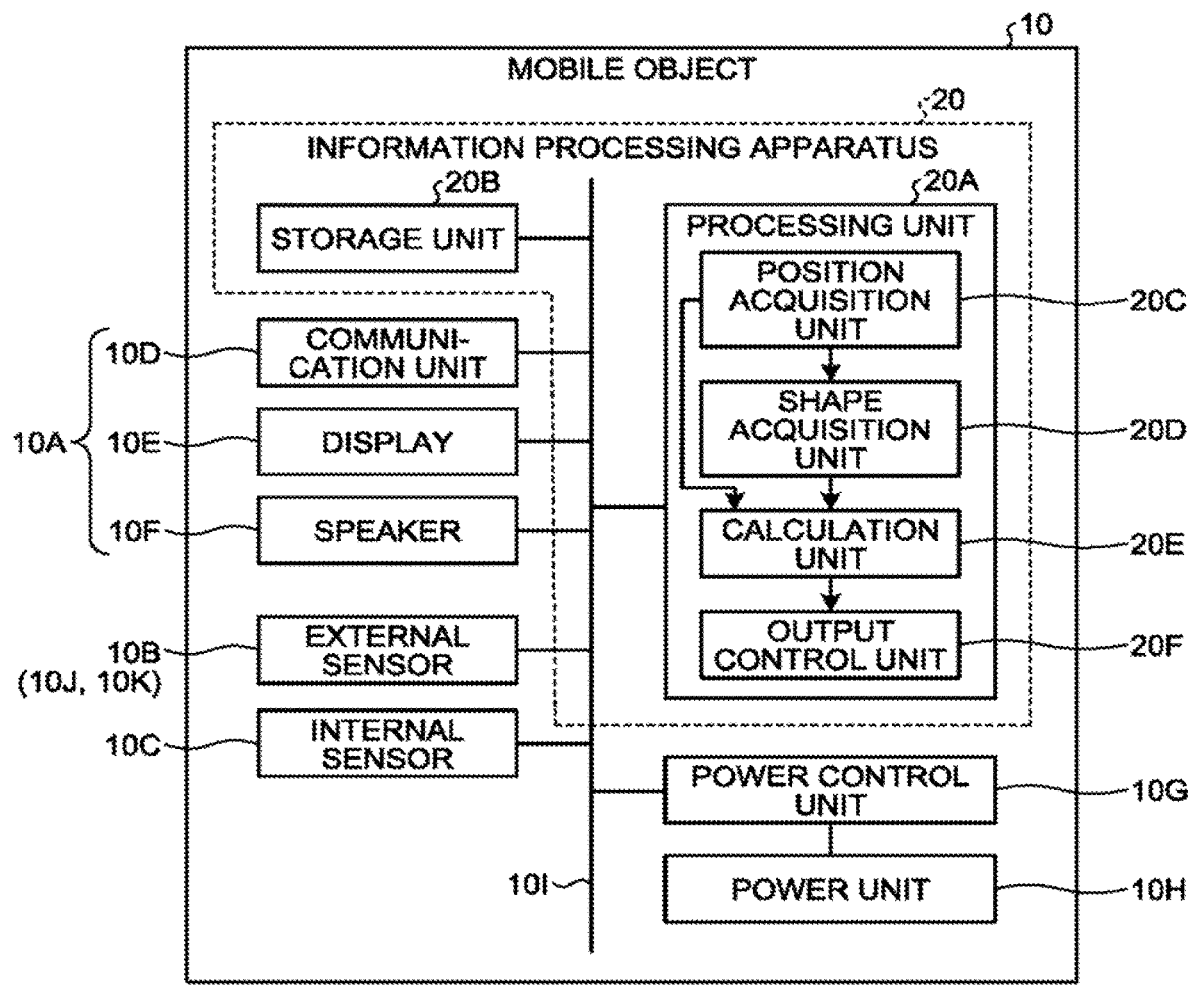
FIG. 2 is a block diagram illustrating a configuration of the mobile object.

Next, the electrical configuration of the mobile object 10 will be described in detail. FIG. 2 is a block diagram illustrating an exemplary configuration of the mobile object 10.

The mobile object 10 includes the information processing apparatus 20, the output unit 10A, the external sensor 10B, the internal sensor 10C, the power control unit 10G, and the power unit 10H. As described above, the output unit 10A includes the communication unit 10D, the display 10E, and the speaker 10F.

The information processing apparatus 20, the output unit 10A, the external sensor 10B, the internal sensor 10C, and the power control unit 10G are connected via a bus 10I. The power unit 10H is connected to the power control unit 10G.

The information processing apparatus 20 includes a storage unit 20B and a processing unit 20A. In other words, the output unit 10A, the external sensor 10B, the internal sensor 10C, and the power control unit 10G, the processing unit 20A, and the storage unit 20B are connected via the bus 10I.

Note that at least one of the storage unit 20B, the output unit 10A (the communication unit 10D, the display 10E, and the speaker 10F), the external sensor 10B, the internal sensor 10C, and the power control unit 10G may be connected to the processing unit 20A by wire or wirelessly. In addition, at least one of the storage unit 20B, the output unit 10A (the communication unit 10D, the display 10E, and the speaker 10F), the external sensor 10B, the internal sensor 10C, and the power control unit 10G may be connected to the processing unit 20A via a network.

The storage unit 20B stores various kinds of data. The storage unit 20B is a random access memory (RAM), a semiconductor memory device such as a flash memory, a hard disk, or an optical disk, for example. Note that the storage unit 20B may be a storage apparatus that is provided outside the information processing apparatus 20. Furthermore, the storage unit 20B may be a storage medium. Specifically, the storage medium may be a medium in which programs or various kinds of information is downloaded via a local area network (LAN), the Internet, or the like and are stored or temporarily stored. Furthermore, a plurality of storage mediums may constitute the storage unit 20B.

Figure 3:
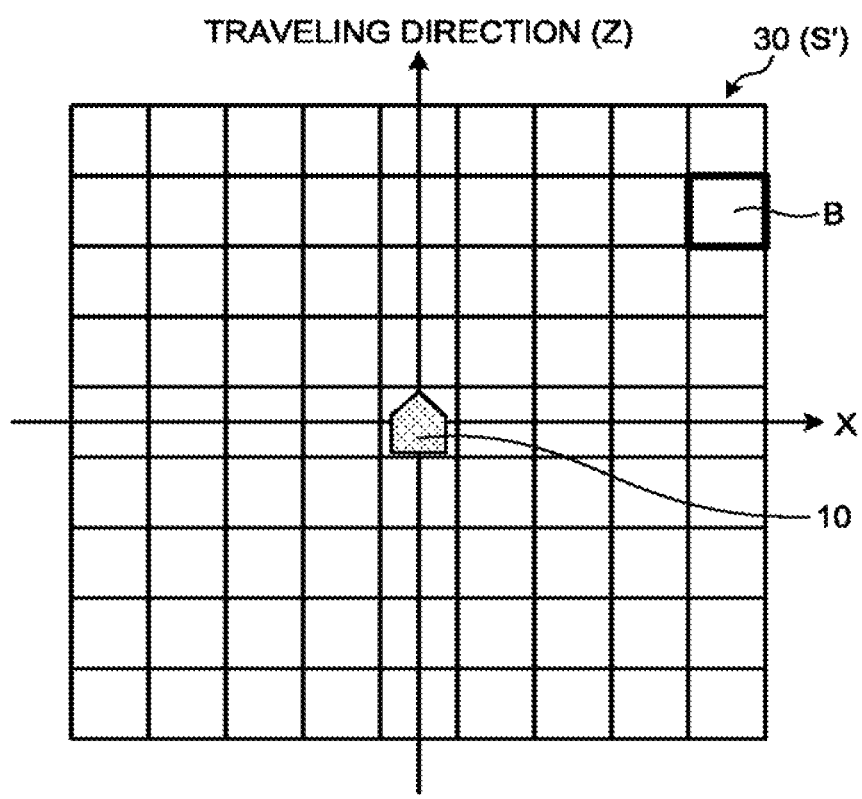
FIG. 3 is a schematic diagram illustrating partitioned region information.

In the present embodiment, the storage unit 20B stores partitioned region information in advance. FIG. 3 is a schematic diagram illustrating an example of partitioned region information 30.

The partitioned region information 30 is information indicating a partitioned region B in the surroundings of the mobile object 10. In the present embodiment, the partitioned region information 30 is information indicating each of a plurality of partitioned regions B into which the surroundings of the mobile object 10 are partitioned. The partitioned regions B are, for example, individual regions acquired by partitioning a three-dimensional space S' (orthogonal coordinate space) surrounding the mobile object 10 into a plurality of regions in a grid. More specifically, the partitioned regions B are individual regions acquired by partitioning the three-dimensional space S' surrounding the mobile object 10 into a plurality of regions along a plane (XZ plane) orthogonal to the height direction (vertical direction). Note that the orthogonal coordinate space is a three-dimensional space represented by an orthogonal coordinate system. In addition, a polar coordinate space described later is a three-dimensional space represented by a polar coordinate system.

The partitioned regions B are not limited to any particular shape. For example, the partitioned regions B have a rectangular shape. In addition, the partitioned regions B are not limited to a square shape. The partitioned regions B may have a rectangular shape, for example.

Note that the partitioned regions B may be equal to or larger than detection points in size which are acquired by the external sensor 10B. That is, the partitioned regions B may be the same as the detection points in size. In addition, each partitioned region B may have a size that can include a plurality of detection points. That is, the size of each partitioned region B may be the same as the size corresponding to the sensor resolution which is the maximum density of detection points that can be acquired by the external sensor 10B, or may be larger than the size corresponding to the sensor resolution. In addition, the maximum possible size of each partitioned region B may be appropriately adjusted according to the unit of the existence probabilities of obstacles.

In the present embodiment, a description will be given of a case where the partitioned regions B are larger than detection points in size which are acquired by the external sensor 10B. In the present embodiment, therefore, a description will be given of a case, as an example, where a plurality of detection points is included in one partitioned region B.

The processing unit 20A generates the partitioned region information 30 in advance. For example, the processing unit 20A defines the three-dimensional space S'. This three-dimensional space S' is a three-dimensional orthogonal coordinate space with the mobile object 10 as the origin, the traveling direction of the mobile object 10 as the Z-axis, the height direction as the Y-axis, and the axis orthogonal to the Z-axis and the Y-axis as the X-axis. Then, the processing unit 20A partitions this three-dimensional space S' into a grid along the XZ plane, thereby partitioning the surroundings of the mobile object 10 into the plurality of partitioned regions B. Then, the processing unit 20A stores the partitioned region information 30 in the storage unit 20B in advance. The partitioned region information 30 indicates the position and the size of each of the partitioned regions B.

Note that an external apparatus may generate the partitioned region information 30. In this case, the information processing apparatus 20 may acquire the partitioned region information 30 from the external apparatus via the communication unit 10D and store the partitioned region information 30 in the storage unit 20B. In the present embodiment, the storage unit 20B stores the partitioned region information 30 in advance.

The description will continue, returning to FIG. 2. The processing unit 20A includes a position acquisition unit 20C, a shape acquisition unit 20D, a calculation unit 20E, and an output control unit 20F. The position acquisition unit 20C, the shape acquisition unit 20D, the calculation unit 20E, and the output control unit 20F are implemented by one or a plurality of processors, for example. Each of the above units may be implemented by causing a processor such as a central processing unit (CPU) to execute a program, that is, software, for example. Each of the above units may be implemented by a processor such as a dedicated integrated circuit (IC), that is, hardware. Each of the above units may be implemented by using software and hardware in combination. In the case of using the plurality of processors, each processor may implement one of the units, or may implement two or more of the units.

Note that the term "processor" used in the present embodiment and embodiments described later refers to, for example, a CPU, a graphical processing unit (GPU), an application specific integrated circuit (ASIC), or a circuit of a programmable logic device (e.g., a simple programmable logic device (SPLD), a complex programmable logic device (CPLD), and a field programmable gate array (FPGA)).

The processor implements each of the units above by reading and executing the program stored in the storage unit 20B. Note that instead of storing the programs in the storage unit 20B, the program may be directly incorporated into the circuit of the processor. In this case, the processor implements each of the units above by reading and executing the program incorporated in the circuit.

The position acquisition unit 20C acquires position-related information. The position-related information includes at least three-dimensional position information of the detection points. In the present embodiment, the position-related information includes the three-dimensional position information of the detection points, the partitioned region information 30, and the self position and attitude information.

The position acquisition unit 20C acquires the three-dimensional position information of the detection points from the external sensor 10B. That is, the position acquisition unit 20C acquires the three-dimensional position information of each of the plurality of detection points detected by the external sensor 10B. Specifically, the position acquisition unit 20C acquires the three-dimensional position information for the detection points corresponding to the density of the detection points detectable by the external sensor 10B, that is, the number corresponding to the resolution of the external sensor 10B. The three-dimensional position information of the detection points is represented by polar coordinates, for example. Note that the external sensor 10B may acquire three-dimensional information of the detection points represented by orthogonal coordinates.

Note that the position acquisition unit 20C may acquire the three-dimensional position information of the detection points from the external apparatus. In this case, the position acquisition unit 20C may acquire the three-dimensional position information of the detection points from the external apparatus via the communication unit 10D.

Furthermore, the position acquisition unit 20C acquires the partitioned region information 30 from the storage unit 20B. Note that the position acquisition unit 20C may acquire the partitioned region information 30 from the external apparatus via the communication unit 10D.

The self position and attitude information is information indicating the three-dimensional position and attitude of the mobile object 10. That is, the self position and attitude information includes the three-dimensional position information and attitude information of the mobile object 10. In the present embodiment, the position acquisition unit 20C acquires the self position and attitude information from the internal sensor 10C. Note that the three-dimensional position information of the mobile object 10 is represented by world coordinates, for example.

Then, the position acquisition unit 20C outputs the position-related information to the shape acquisition unit 20D and the calculation unit 20E. The position-related information includes the three-dimensional position information of each of the plurality of detection points, the partitioned region information 30, and the self position and attitude information.

Next, the shape acquisition unit 20D will be described. The shape acquisition unit 20D acquires target surface shape information indicating the shape of a target surface.

The target surface is a surface to be detected by the information processing apparatus 20. The target surface is a ground surface, a road surface, or a wall surface, for example. In the present embodiment, a description will be given of a case, as an example, where the target surface is the ground surface.

The target surface shape information is information indicating the shape of the target surface. In the present embodiment, a description will be given of a case, as an example, where the target surface shape information is ground surface shape information indicating the shape of the ground surface. In the present embodiment, therefore, a description will be given of a case, as an example, where the shape acquisition unit 20D acquires the ground surface shape information of the ground surface.

In the present embodiment, the shape acquisition unit 20D estimates the ground surface shape information according to the distribution of the detection points indicated by each of the plurality of three-dimensional position information received from the position acquisition unit 20C. Through this estimation, the shape acquisition unit 20D acquires the ground surface shape information.

Figure 4A:
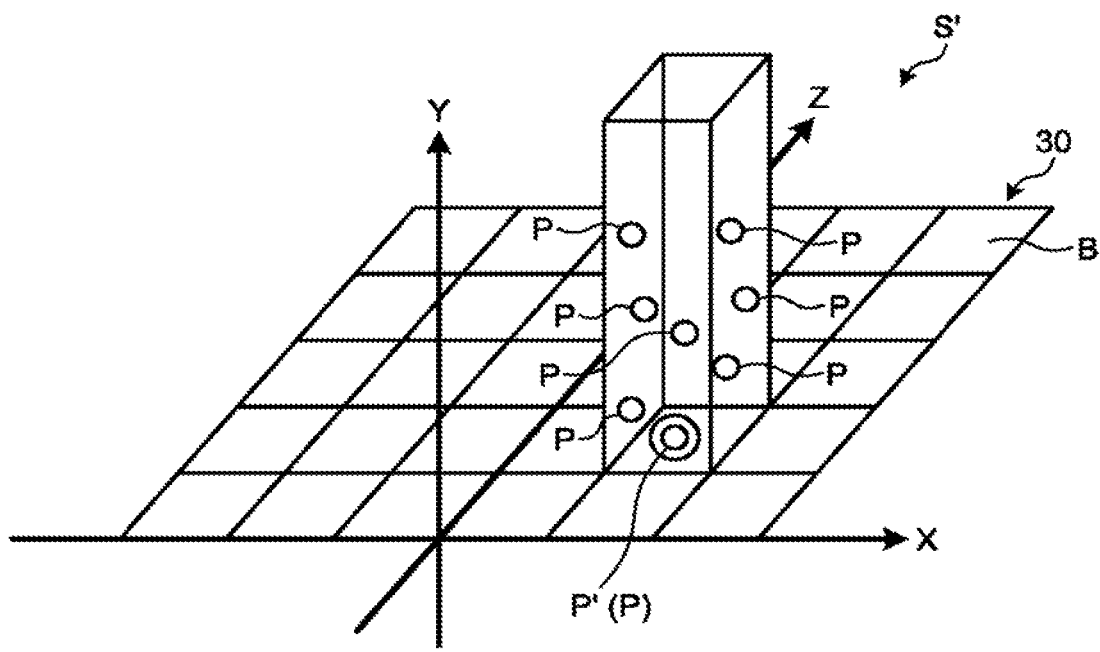
FIGS. 4A and 4B are explanatory diagrams of estimated ground surface shape information.
Figure 4B:
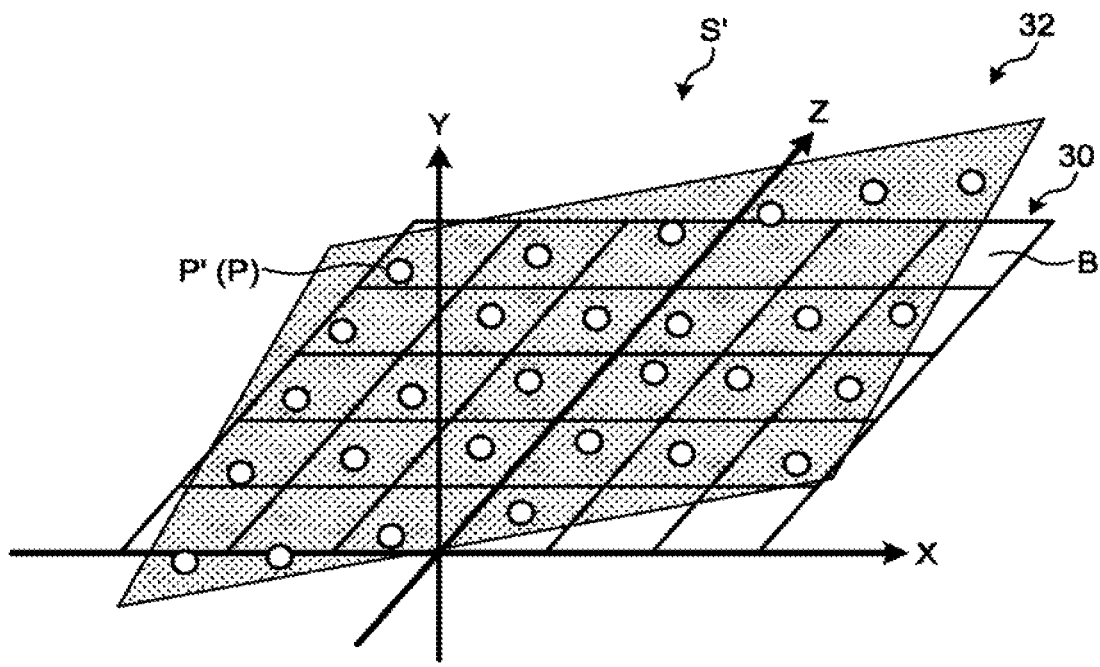
Figure 5:
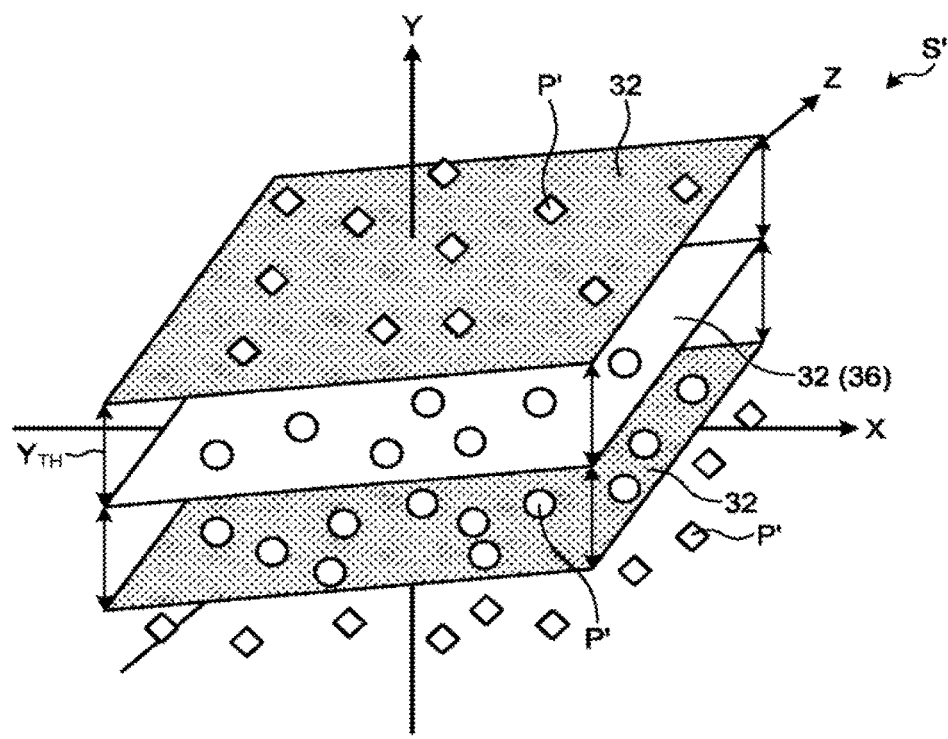
FIG. 5 is an explanatory diagram of the estimated, ground surface shape information.

FIGS. 4A, 4B, and 5 are explanatory diagrams of an example of estimation of ground surface shape information 36.

For example, the shape acquisition unit 20D arranges each detection point P in a corresponding position indicated by the three-dimensional position information, as illustrated in FIG. 4A. The three-dimensional position information indicates each detection point P in the three-dimensional space S' indicated by the partitioned region information 30. Note that in a case where the three-dimensional position information of the detection points P is represented by polar coordinates, the detection points P may be arranged in the three-dimensional space S' of the partitioned region information 30 following conversion into the orthogonal coordinates.

FIG. 4A illustrates the detection points P arranged in a certain partitioned region B. For example, the detection points P are arranged assuming that the position of the origin in the three-dimensional space S' indicated by the partitioned region information 30 is the current position of the mobile object 10.

Then, the shape acquisition unit 20D specifies one detection point P having the lowest height (the position in the Y-axis direction) as a representative detection point P (representative detection point P') for each of the plurality of partitioned regions B indicated by the partitioned region information 30. This is based on the assumption that the detection points P corresponding to the ground surface in a space surrounding the mobile object 10 exist at the lowest positions in the respective partitioned regions B. As illustrated in FIG. 4B, therefore, one detection point P is specified as a representative detection point P' for each of the plurality of partitioned regions B indicated by the partitioned region information 30.

Next, the shape acquisition unit 20D performs plane approximation for the representative detection points P' specified for the respective partitioned regions B in the partitioned region information 30. For plane approximation, a RANdom SAmple Consensus (RANSAC) method is used, for example.

Specifically, the shape acquisition unit 20D randomly selects three representative detection points P' from the representative detection points P' corresponding to respective ones of the plurality of partitioned regions B. Then, a plane equation indicating an estimated plane 32 including the selected three representative detection points P' is calculated. The plane equation indicating the estimated plane 32 is represented by the following equation (1).

$$aX + bY + cZ + d = 0 \tag{1}$$

In the equation (1), a, b, c, and d are coefficients representing the shape of the estimated plane 32.

Subsequently, any representative detection points P' whose errors in the Y-axis direction relative to the estimated plane 32 are equal to or less than a predetermined threshold value $Y_{TH}$ are set as inliers by the shape acquisition unit 20P. Then, the shape acquisition unit 20D counts the number of representative points P' set as inliers (hereinafter, referred to as the number of inliers).

FIG. 5 is a schematic diagram illustrating a relationship between the estimated plane 32 and the representative detection points P' as inliers. In FIG. 5, the representative detection points P' as inliers among the representative detection points P' are indicated by circles. The representative detection points P' as inliers are representative detection points P' whose errors are equal to or less than the threshold value $Y_{TH}$. In addition, the representative detection points P' as outliers are indicated by diamond marks in FIG. 5. The representative detection points P' as outliers are representative detection points P' whose errors exceed the threshold value $Y_{TH}$.

Then, the shape acquisition unit 20D repeats the series of processing the number of predetermined times while changing the combination of the selected representative detection points P'. The series of processing includes the selection of three representative detection points P' from the plurality of partitioned regions B, the calculation of the plane equation of the estimated plane 32, and the count of the number of inliers. Then, the shape acquisition unit 20D acquires, as the ground surface shape information 36, the plane equation of the estimated plane 32 used for the calculation of the largest number of inliers.

Note that the shape acquisition unit 20D may acquire the ground surface shape information 36 using a method other than the plane approximation. The shape acquisition unit 20D may acquire the ground surface shape information 36 using curved surface approximation, or straight-line approximation or curved-line approximation in the YZ plane, for example.

The shape acquisition unit 20D outputs the acquired ground surface shape information 36 to the calculation unit 20E.

The description will continue, returning to FIG. 2. Next, the calculation unit 20E will be described. The calculation unit 20E calculates state information of an object.

The object is an object to be detected by the information processing apparatus 20. The object is, for example, an obstacle or the like that obstructs the traveling of the mobile object 10. Note that the object is not limited to an obstacle. In the present embodiment, a description will be given of a case, as an example, where the object whose state information is calculated by the calculation unit 20E is an obstacle.

The state information is information indicating the state of the object. The state of the object is the existence probability of the object, the probability that the object does not exist, the occupation ratio of the object, or the probability that the object does not occupy, for example. The state information indicates the existence probability of the object, for example.

In the present embodiment, a description will be given of a case, as an example, where the state information indicates the existence probability of an obstacle. In the present embodiment, therefore, a description will be given of a case, as an example, where the calculation unit 20E calculates the existence probability information indicating the existence probability of an obstacle. The existence probability is represented by a value in a range of 0.0 or more and 1.0 or less.

The calculation unit 20E calculates the existence probability of an obstacle according to a first distance on the basis of the three-dimensional position information of the corresponding detection point F acquired from the position acquisition unit 20C and the ground surface shape information 36 acquired from the shape acquisition unit 20D.

The first distance is a distance of the detection point P from the ground surface. In other words, the first-distance is the height of the detection point P from the ground surface.

Specifically, the first distance is represented by a difference between the ground surface having the shape indicated by the ground surface shape information 36 and the position in the height direction (Y-axis direction) of the detection point P indicated by the three-dimensional position information. Note that the first distance may be represented by the length of a perpendicular line drawn from the detection point P arranged at the position indicated by the three-dimensional position information down to the ground surface having the shape indicated by the ground surface shape information 36.

In the present embodiment, the calculation unit 20E calculates the existence probability of an obstacle by calculating the first distance for the corresponding detection point P using the three-dimensional position information of the detection point P and the ground surface shape information 36.

The calculation unit 20E calculates a lower existence probability as the first distance is shorter. In other words, the calculation unit 20E calculates a higher existence probability as the first distance is longer. Note that as the first distance is shorter, the position of the detection point P is closer to the ground surface. In addition, as the first distance is longer, the position of the detection point P is higher to the ground surface.

Note that in a case where the first distance is equal to or less than 0, the calculation unit 20E calculates a predetermined intermediate value as the existence probability. The intermediate value is an intermediate value of "0.5" between 0.0, which is the minimum value of the existence probability, and 1.0, which is the maximum value of the existence probability. The intermediate value indicates that the state is unknown.

In the present embodiment, the processing unit 20A treats the region with the intermediate value of "0.5" as an "unknown region" whose state is unknown. The unknown state indicates a state that the processing unit 20A cannot confirm the existence probability due to shielding of an object or the like. In the present embodiment, furthermore, the processing unit 20A treats the region with the minimum value of "0.0" of the existence probability as a "travelable region" where no obstacle exists. In addition, the processing unit 20A treats the region with the maximum value of "1.0" of the existence probability as an "occupied region" where an obstacle exists.

Therefore, as the existence probability approaches the maximum value of "1.0" from the intermediate value of "0.5", this indicates the increasing possibility of approaching the "occupied region" from the "unknown region". In addition, as the existence probability approaches the minimum value of "0.0" from the intermediate value of "0.5", this indicates the increasing possibility of approaching the "travelable region" from the "unknown region".

Note that the calculation unit 20E may calculate an existence probability that a second distance is included in addition to the first distance. The second distance indicates a distance between a reference position and the position of the detection point P indicated by the three-dimensional position information. The reference position is the current position of the mobile object 10 in which the information processing apparatus 20 is mounted. That is, the second distance is a distance between the position of the mobile object 10 and the position of the detection point P. In the following description, the reference position may be referred to as the mobile object 10 or the position of the mobile object 10.

In the present embodiment, the calculation unit 20E calculates the existence probability which is lower as the first distance is shorter, and is lower as the second distance is longer.

Specifically, the calculation unit 20E calculates the existence probability according to the first distance of a detection point P closest to the reference position in a corresponding angular direction ($\phi$ direction, which hereinafter may be referred to as an angular direction $\phi$) from the reference position (position of the mobile object 10). The angular direction $\phi$ is the direction of $\phi$ which is an argument in polar coordinates. That is, the angular direction $\phi$ indicates an orientation with the current position of the mobile object 10 as the origin on the plane orthogonal to the vertical direction.

First, the calculation unit 20E identifies a detection point P which exists in the closest position to the mobile object 10 for each angular direction $\phi$ from the mobile object 10. For the detection point P, the calculation unit 20E then calculates a lower existence probability as the first distance is shorter.

Specifically, the calculation unit 20E identifies a detection point P which exists in the closest position to the mobile object 10 for each angular direction $\phi$. For the identified detection point P, the calculation unit 20E then calculates a lower existence probability as the first distance of the detection point P is shorter. For the identified detection point P, as the first distance of the detection point P is shorter, the calculation unit 20E calculates a value closer to the intermediate value of "0.5" as the existence probability of an obstacle at the detection point P, for example.

For this detection point P, in the present embodiment, the calculation unit 20E calculates the existence probability which is lower as the first distance is shorter, and is lower as the second distance is longer. In other words, for the detection point P which exists in the closest position to the mobile object 10 for each angular direction $\phi$, the calculation unit 20E calculates the existence probability which is lower as the height from the ground surface (first distance) is shorter, and is lower as the distance from the mobile object 10 (second distance) is longer.

Then, along a line extending in the angular direction $\phi$ from the position of the mobile object 10 in the polar coordinate space, the calculation unit 20E calculates a model indicating the change in the existence probability according to the distance from the position of the mobile object 10 as well as the existence probability of the detection point P which exists in the closest position to the mobile object 10 in the corresponding angular direction.

For example, the calculation unit 20E sets the existence probabilities of the minimum value in a direction approaching from the mobile object 10 to the detection point P closest to the mobile object 10 for each line along the corresponding angular direction $\phi$ from the reference position with the mobile object 10 as a reference in the polar coordinate space. Furthermore, the calculation unit 20E sets a model indicating the existence probabilities along the line extending in the corresponding angular direction $\phi$ with the mobile object 10 as a reference. In the model, as the distance is closer to the detection point P which is closest to the mobile object 10, the existence probabilities change from the minimum value to the existence probability of the detection point P. Furthermore, the calculation unit 20E calculates the existence probabilities such that a region far from the mobile object 10 than the detection point P closest to the mobile object 10 is set to the existence probability of the intermediate value.

At this time, it is preferable that for each line extending in the corresponding angular direction $\phi$ from the reference position with the mobile object 10 as a reference in the polar coordinate space, the calculation unit 20E calculates a model indicating the existence probabilities which smoothly change before and after the detection point P closest to the mobile object 10 along the corresponding line. The regions where the existence probabilities change smoothly may be set in advance. As the regions where the existence probabilities smoothly change, the calculation unit 20E may use a predetermined number of partitioned regions B other than and adjacent to a partitioned region B including the detection point P which exists in the closest position to the mobile object 10 for each of the angular directions $\phi$, for example.

In the present embodiment, the calculation unit 20E calculates the existence probabilities that satisfy the above conditions by calculating the equations.

Hereinafter, a further detailed description will be given of the calculation of the existence probabilities by the calculation unit 20E in the present embodiment.

First, the calculation unit 20E acquires the position-related information from the position acquisition unit 20C. As described above, the position-related information includes the three-dimensional position information of each of the plurality of detection points P, the partitioned region information 30, and the self position and attitude information.

Subsequently, the calculation unit 20E extracts detection points P to be used for the calculation of the existence probabilities among the plurality of detection points P indicated by each of the plurality of pieces of three-dimensional position information acquired from the position acquisition unit 20C.

Figure 6:
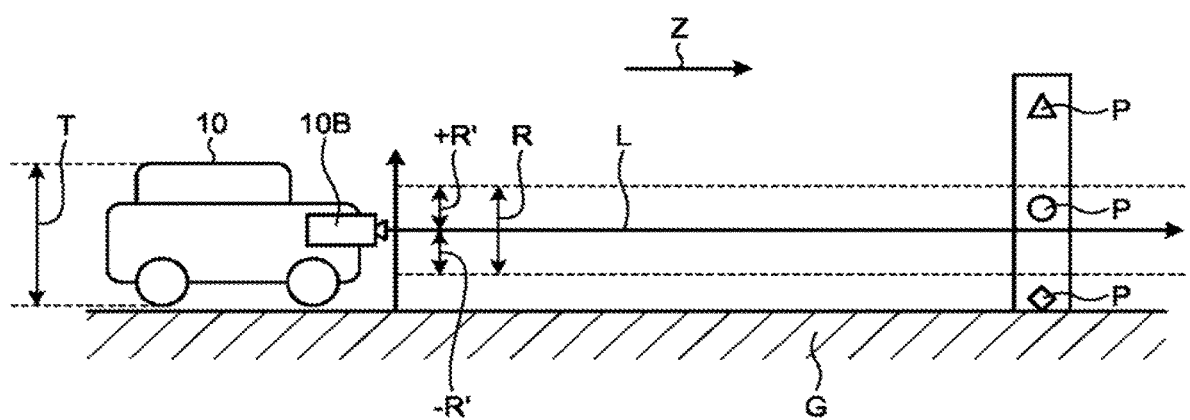
FIG. 6 is an explanatory diagram of extraction of detection points.

FIG. 6 is an explanatory diagram illustrating an example of extraction of detection points P. Among the plurality of detection points P, the calculation unit 20E extracts detection point P located in a space within a predetermined range in a three-dimensional space as detection points P used for calculation of the existence probabilities. In the predetermined range, the traveling direction Z of the mobile object 10 is the central axis L. The central axis L is a long straight line that passes through a predetermined position in the mobile object 10 and that extends in a direction along the traveling direction Z of the mobile object 10. The predetermined position in the mobile object 10 is the center of the body of the mobile object 10, or the center in the height direction of a tire provided in the mobile object 10, for example.

For example, assume that the external sensor 10B is mounted in the mobile object 10 such that the optical axis of the external sensor 10B matches the center of the mobile object 10 and the traveling direction Z. In this case, the optical axis of the external sensor 10B matches the central axis L.

Then, the calculation unit 20E uses the space of a predetermined range R as a space from which detection points P are extracted. The predetermined range R includes the central axis L and is centered on the central axis L. The space in this predetermined range is a region R that includes the central axis L and has a range of ±R' in the vehicle height direction of the mobile object 10 with the central axis L as the center. Note that the range of the region R is adjusted in advance such that the region does not include a ground surface G while the mobile object 10 is traveling. For example, the length in the vertical direction of the region R is less than the vehicle height T of the mobile object 10.

In the present embodiment, a description will be given of a case where the external sensor 10B is arranged so that the line passing through the center of the body of the mobile object 10 matches the optical axis. Then, in the present embodiment, a description will be given of a case where the calculation unit 20E uses the optical axis of the external sensor 10B as the central axis L. Then, among the plurality of detection points P detected by the external sensor 10B, the calculation unit 20E extracts detection points P located in the predetermined range R as detection points P used for calculation of the existence probabilities.

This processing excludes, for example, a detection point P indicated by a triangle and a detection point P indicated by a diamond from the calculation of the existence probabilities as illustrated in FIG. 6. Then, a detection point P indicated by a circle is extracted for the calculation of the existence probability.

In this way, the calculation unit 20E extracts the detection points P for the calculation of the existence probabilities among the plurality of detection points P included in the angle of view of the external sensor 10B. As a result, the calculation unit 20E extracts any detection point P that can be an obstacle to the traveling of the mobile object 10.

Subsequently, in a case where the three-dimensional position coordinates of the extracted detection points P are represented by orthogonal coordinates, the calculation unit 20E converts the three-dimensional position coordinates into polar coordinates. For the conversion into the polar-coordinates, the following equations (2) and (3) are used, for example. Note that in a case where the three-dimensional position coordinates of the detection points P are represented by polar coordinates, this conversion processing is unnecessary.

$$r = \sqrt{x^2 + z^2} \quad (2)$$

$$\theta = \alpha\tan(z/x) \quad (3)$$

Through this processing, the calculation unit 20E obtains a plurality of detection points P for the calculation of the existence probabilities, which is represented by the three-dimensional position coordinates of the polar coordinates.

Figure 7:
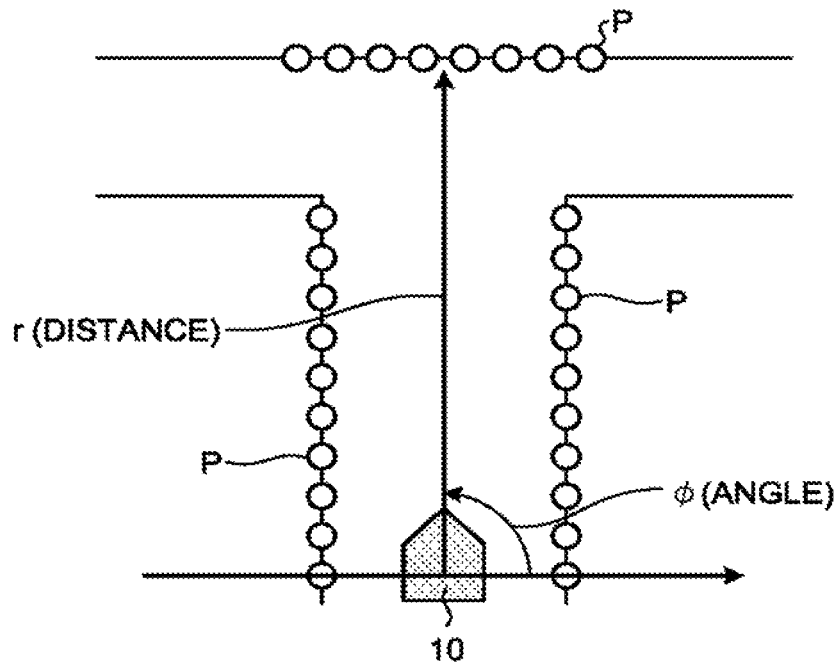
FIG. 7 is a schematic diagram of the detection points.

FIG. 7 is a schematic diagram of detection points P represented by the three-dimensional position coordinates of the polar coordinates. FIG. 7 illustrates each of the detection points P measured in a scene where the mobile object 10 is reaching a T-intersection surrounded by fences.

Next, the calculation unit 20E identifies a detection point P located at the closest distance r to the mobile object 10 for each angular direction φ indicated by the polar coordinates.

Figure 8:
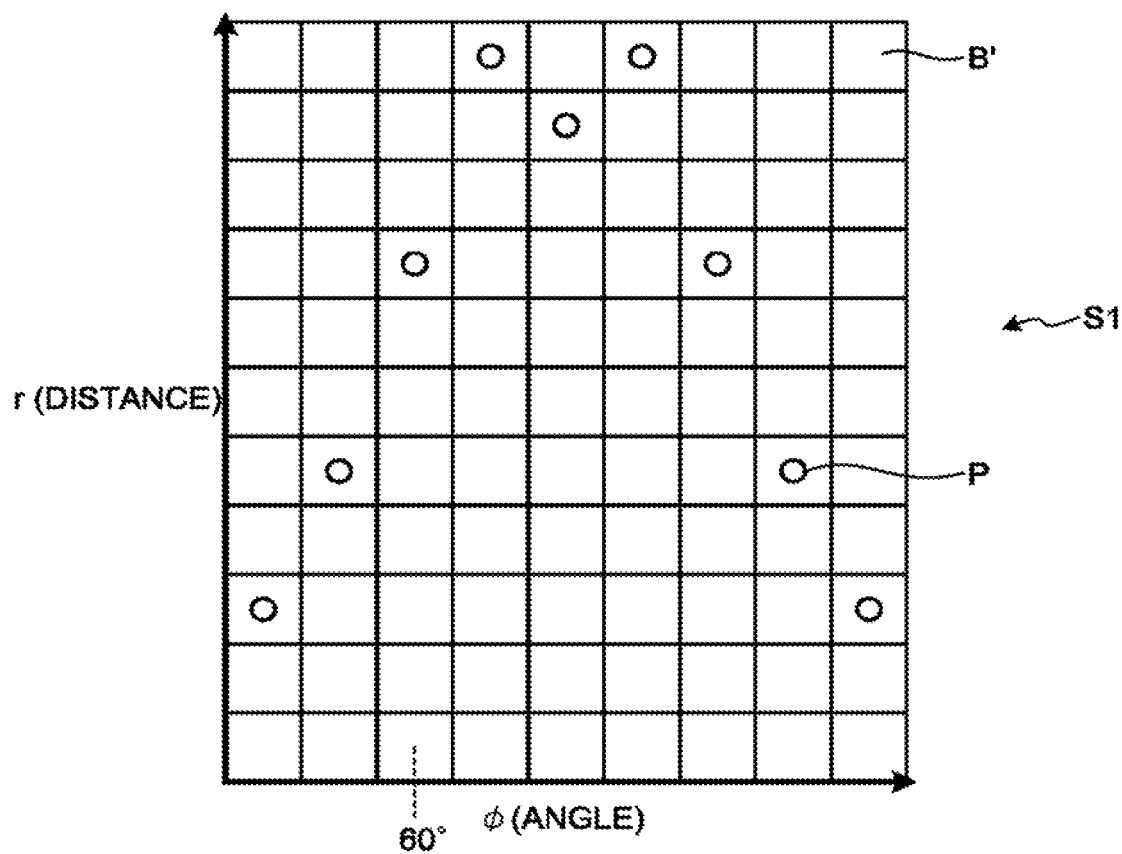
FIG. 8 is a schematic diagram of a polar coordinate space.

FIG. 8 is a schematic diagram illustrating a polar coordinate space S1 surrounding the mobile object 10 for the scene in FIG. 7. The polar coordinate space S1 is divided into nine in the angular direction φ every 20°. For each angular direction φ, the calculation unit 20E identifies a detection point P at the distance r closest to the mobile object 10.

Note that the distance r corresponds to the second distance.

Subsequently, the calculation unit 20E calculates, for each angular direction φ, the existence probability of an obstacle for each of a plurality of regions B' arranged along the respective angular directions φ from the mobile object 10 by using the following equations (4) and (5). The regions B' are regions formed by dividing the polar coordinate space S1 into a plurality of regions. It is preferable that the regions B' are equal to or smaller than the above-described partitioned regions B in size.

$$p(r) = \frac{\alpha}{\sqrt{2\pi\sigma}} \exp\frac{-(r-r_0)^2}{2\sigma^2} \quad (4)$$

$$p'(r) = \begin{cases} \max(p_{min}, p(r)) & r \le r_0 \\ \max(0.5, p(r)) & r > r_0 \end{cases} \quad (5)$$

In the equations (4) and (5), p(r) indicates a temporary existence probability of an obstacle. The temporary existence probability indicates a temporary value in the process of calculating the existence probability. The distance in the polar coordinates is indicated by r. The distance r from the origin in the polar coordinates to a detection point P closest to the mobile object 10 in the corresponding angular direction φ to be processed is indicated by $r_0$. The origin in the polar coordinates is derived from the self position and attitude information of the mobile object 10.

In the equation (4), σ indicates a standard deviation in the depth direction of the three-dimensional position information acquired by the position acquisition unit 20C. σ can be acquired in advance depending on the characteristics of the external sensor, and the value obtained in advance is used. In the equation (5), p'(r) indicates the existence probability of an obstacle. A predetermined minimum value of the existence probability is indicated by $P_{min}$. In the present embodiment, $P_{min}$ is "0.0".

α is determined according to the first distance and the second distance of a detection point P which exists in the closest position to the mobile object 10 in the corresponding angular direction φ to be processed. The first distance is the height of the detection point P from the ground surface. The second distance is the distance $r_0$ of the detection point P from the mobile object 10. In addition, the equation (4) includes the elements (r and $r_0$) indicating the distance (second distance) of the detection point P.

In other words, in the present embodiment, the calculation unit 20E derives, for each angular direction φ, α according to the first distance and the second distance of a detection point P which exists in the closest position to the mobile object 10 in the corresponding angular direction φ. Then, the calculation unit 20E calculates, for each angular direction φ, the existence probability p' (r) for each distance r from the mobile object 10 along each of the lines extending along the respective angular directions ϕ by using the equations (4) and (5) above.

As a result, the calculation unit 20E calculates the existence probabilities for each of the angular directions ϕ with the mobile object 10 as a reference. In other words, the calculation unit 20E calculates the existence probability for each of the plurality of regions B' through which the line passes along each of the angular directions ϕ with the mobile object 10 as a reference.

A detailed description will be given of α.

The calculation unit 20E calculates α for each angular direction ϕ indicated by the polar coordinates. For example, the calculation unit 20E divides the polar coordinate space S1 in front of the traveling direction of the mobile object 10 in the angular direction ϕ every 20° (nine divisions). Then, the calculation unit 20E sets each angular direction ϕ as a direction to be processed, and then performs the following processing.

First, the coordinates of a detection point P closest to the mobile object 10 (i.e., a detection point P at the distance $r_0$) in the corresponding angular direction ϕ to be processed is set as $(X_i, Y_i, Z_i)$ by the calculation unit 20E. Furthermore, the calculation unit 20E acquires the plane equation indicating the ground surface shape information 36 calculated by the shape acquisition unit 20D. As described above, the plane equation is represented by the above equation (1).

By using the following equation (6), the calculation unit 20E subsequently calculates the first distance of the detection point P closest to the mobile object 10 (the detection point P at the distance $r_0$) in the corresponding angular direction ϕ to be processed. The first distance is the distance from the ground surface.

$$h_1 = \max\left(0.0, Y_i - \left(\frac{-aX_i - cZ_i - d}{b}\right)\right) \quad (6)$$

In the equation (6), $h_i$ indicates the first distance of the detection point P closest to the mobile object 10 (the detection point P at the distance $r_0$). The first distance is the distance from the ground surface. In the equation (6), a, b, and c are similar to those in the above equation (1). In the equation (6), furthermore, $X_i, Y_i, Z_i$ are the coordinates of the detection point P closest to the mobile object 10 (i.e., the detection point P at the distance $r_0$).

Using the following equation (7), the calculation unit 20E calculates the value of α in the corresponding angular direction ϕ to be processed by using the first distance $h_i$ acquired by the equation (6). The first distance $h_i$ is the distance, from the ground surface, of the detection point P (the detection point P at the distance $r_0$) closest to the mobile object 10 in the corresponding angular direction.

$$\alpha = \min\left(\max\left(0.5, \frac{h_i}{h_{TH}}\right), 1.0\right) \quad (7)$$

In the equation (7), $h_{TH}$ indicates a threshold value of the first distance of the detection point P from the ground surface.

That is, in a case where $h_i$ calculated by the equation (6) is equal to or larger than the threshold value $h_{TH}$ ($h_i \geq h_{TH}$), α becomes 1 according to the above equation (7). Furthermore, in a case where $h_i$ calculated by the equation (6) is less than the threshold value $h_{TH}$ (hi<$h_{TH}$), α becomes a value larger than 0.5 and less than 1 according to the above equation (7). The longer $h_i$, the larger α becomes.

Note that $h_{TH}$ may be a predetermined fixed value. Furthermore, the calculation unit 20E may set the threshold value $h_{TH}$ according to the mobile object 10 and the distance $r_0$ between the mobile object 10 and the detection point P closest to the mobile object 10 in the corresponding angular direction ϕ to be processed.

In the present embodiment, the calculation unit 20E calculates the threshold value $h_{TH}$ using the following equation (8).

$$h_{TH} = \tan\theta_{th} \times r \quad (8)$$

In the equation (8), $\theta_{th}$ indicates a threshold value of the angle θ of the detection point P with respect to the ZX plane in the polar coordinate space. In other words, $\theta_{th}$ indicates a threshold value of the angle θ of the detection point P with respect to the ground surface with the mobile object 10 as the origin. In the equation (8), furthermore, r indicates the distance $r_0$ between the mobile object 10 and the detection point P closest to the mobile object 10 in the corresponding angular direction ϕ to be processed.

The calculation unit 20E calculates the threshold value $h_{TH}$ using the equation (8). In this way, the calculation unit 20E may calculate the threshold value $h_{TH}$ according to the distance $r_0$ between the mobile object 10 and the detection point P closest to the mobile object 10 in the corresponding angular direction ϕ to be processed. Therefore, the longer the distance $r_0$, the larger the threshold value $h_{TH}$ is used by the calculation unit 20E.

In this way, the calculation unit 20E calculates α for each angular direction ϕ to be processed by using the equations (6) and (7). α corresponds to the first distance (the distance from the ground surface) and the second distance (the distance $r_0$ from the mobile object 10) of the detection point P closest to the mobile object 10 in the corresponding angular direction ϕ.

Then, the calculation unit 20E calculates, for each angular direction ϕ to be processed, the existence probability of an obstacle using the calculated α for each of the regions B' along the respective angular directions by using the equations (4) and (5).

Therefore, the calculation unit 20E calculates the existence probability of an obstacle according to the conditions of the first distance and the second distance for each of the regions B' along the respective angular directions ϕ.

FIGS. 9 to 12 are schematic diagrams illustrating the existence probabilities calculated by the calculation unit 20E.

Figure 9:
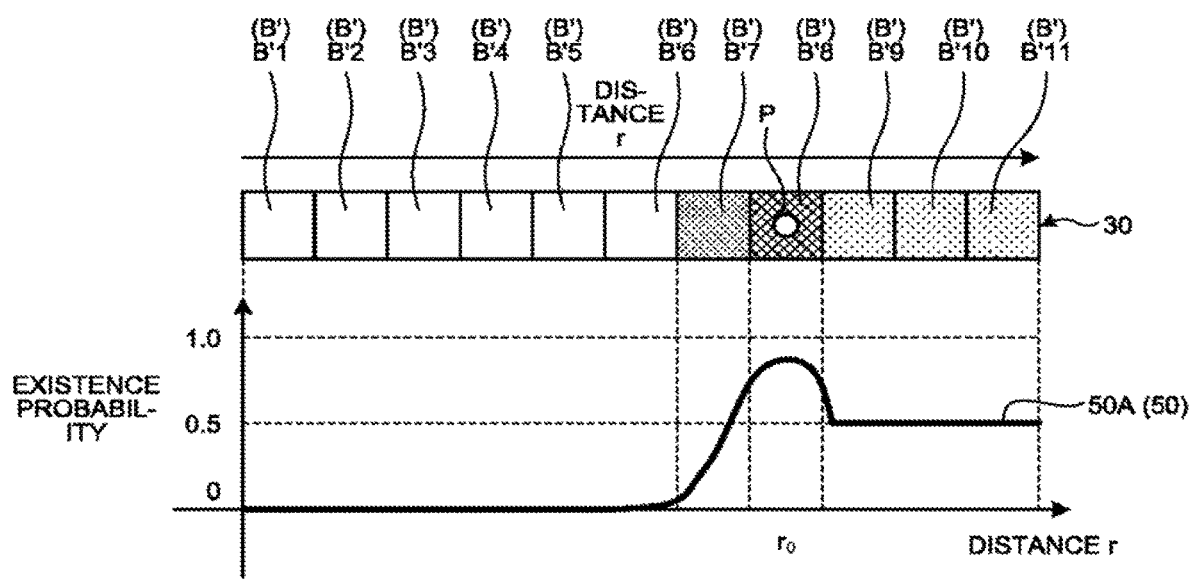
FIG. 9 is a schematic diagram illustrating existence probabilities.

FIG. 9 is a schematic diagram illustrating the plurality of extracted regions B' arranged along the angular direction "60°" in FIG. 8.

As illustrated in FIG. 9, assume that among the plurality of regions B' arranged along this angular direction ϕ (e.g., a region B'1 to a region B'11), a partitioned region B'8(B') is a region B' at the distance $r_0$ that includes a detection point F closest to the mobile object 10. In this case, the calculation unit 20E calculates the existence probabilities represented by a model 50A by calculating the existence probabilities for the line along this angular direction ϕ by using the above equations (4) to (8).

That is, as illustrated in FIG. 9, the existence probabilities in the regions B' (B'1 to B'11) sequentially arranged along the angular direction ϕ are represented by the model 50A which changes smoothly before and after the region B'8 including the detection point P closest to the mobile object 10. Furthermore, the existence probability of an obstacle in each region B' is a value corresponding to the first distance (the distance from the ground surface) of the detection point P, which exists in the closest position to the mobile object 10, and the second distance of the detection point P (the distance $r_0$ from the mobile object 10) in the corresponding angular direction $\phi$ as a result of calculation using the above equations (4) to (8).

FIG. 10A to FIG. 10F are explanatory diagrams illustrating examples of the existence probabilities of obstacles calculated by the calculation unit 20E.

FIG. 10A to FIG. 10F illustrate the examples of the existence probabilities of obstacles for a certain angular direction $\phi$ in the polar coordinate space S1. In addition, FIG. 10A to FIG. 10F illustrate three different types of forms in which the distance $r_0$ to a detection point P closest to the mobile object 10 is the same but the height of the detection point P from the ground surface (first distance) is different from one another.

Figure 10A:
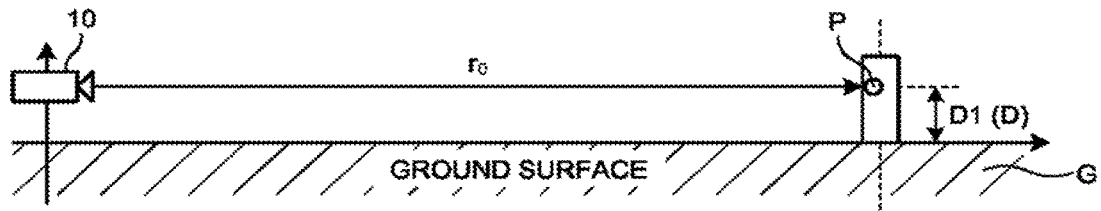
FIGS. 10A-10F is a schematic diagram illustrating existence probabilities.
Figure 10B:
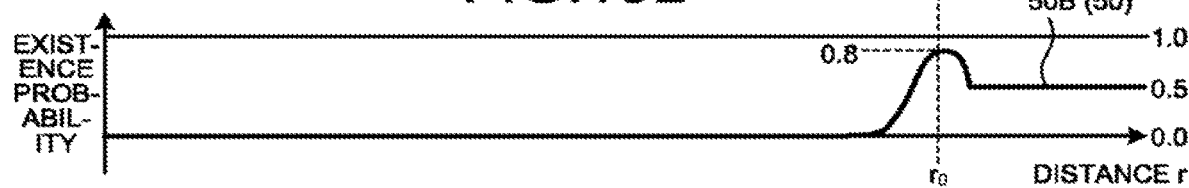

FIG. 10B is a model 50B illustrating the existence probabilities of obstacles in a line along a certain angular direction $\phi$ for a case where the first distance (the height from the ground surface G) of the detection point P closest to the mobile object 10 is D1 in this angular direction $\phi$ (see FIG. 10A). The first distance D1 is an example of the height which is sufficiently away from the ground surface.

Figure 10C:
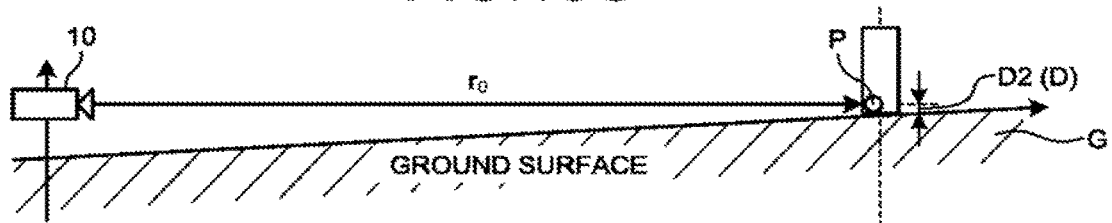
Figure 10D:
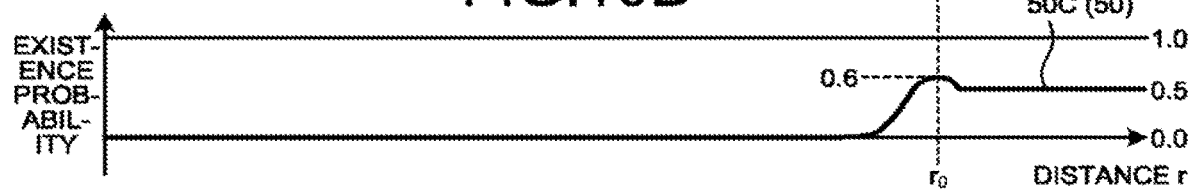

FIG. 10D is a model 50C illustrating the existence probabilities of obstacles in a line along a certain angular direction $\phi$ for a case where the first distance (the height from the ground surface G) of the detection point P closest to the mobile object 10 is D2 in this angular direction $\phi$ (see FIG. 10C). FIG. 10C is a state where the mobile object 10 is traveling uphill, for example. Note that the first distance D2 is an example of the height which is lower than the first distance D1 and higher than the ground surface. That is, the illustrated relationship is the first distance D1>the first distance D2>0.

Figure 10E:
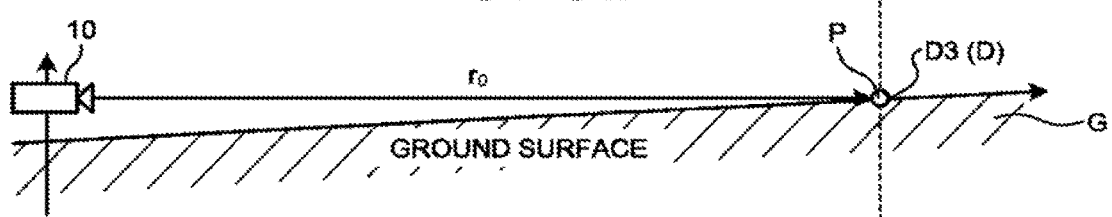
Figure 10F:
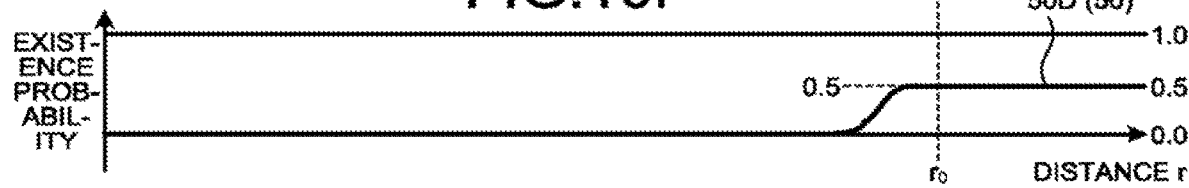

Furthermore, FIG. 10F is a model 50D illustrating the existence probabilities of obstacles in a line along a certain angular direction $\phi$ for a case where the first distance (the height from the ground surface G) of the detection point P closest to the mobile object 10 is D3 in this angular direction $\phi$ (see FIG. 10E). FIG. 10F is a state where the mobile object 10 is traveling downhill, for example. Note that the first distance D3 is an example of the height where the position of the detection point P is on the ground surface. That is, the illustrated relationship is the first distance D3=0.

As illustrated in FIGS. 10B, 10D and 10F, as the first distance of the detection point P which exists in the closest position to the mobile object 10 is shorter, the calculation unit 20E calculates a lower existence probability for the detection point P by using the above equations (4) to (8). For this detection point P, for example, the calculation unit 20E calculates the existence probability of "0.8" in the case of the first distance D1, the existence probability of "0.6" in the case of the first distance D2, and the existence probability of "0.5" in the case of the first distance D3.

Furthermore, the calculation unit 20E calculates, for each angular direction the existence probability of "0.0" of the obstacle toward the detection point P located at the closest distance $r_0$ from the position of the mobile object 10 in the corresponding angular direction $\phi$ by using the above equations (4) to (8). In approaching the detection point P at the distance $r_0$, the calculation unit 20E changes the existence probability toward the existence probability of the detection point P at the distance $r_0$. Then, the calculation unit 20E calculates the intermediate value of "0.5", which is an "unknown region", as the existence probability for a region B' at the distance r far from the mobile object 10 than the distance $r_0$.

Therefore, the calculation unit 20E calculates the existence probabilities which change smoothly before and after the region B' including the detection point P closest to the mobile object 10. These are represented by the models 50B to 50B as the existence probabilities for the regions B' which sequentially exist in the line along the corresponding angular direction $\phi$.

FIGS. 11A-1 to 11D-2 illustrate examples of the existence probabilities of obstacles for a certain angular direction $\phi$ in the polar coordinate space S1. In addition, FIGS. 11A-1 to 11D-2 illustrate a plurality of forms in which the distance $r_0$ (second distance) to a detection point P closest to the mobile object 10 is different from one another.

Figures 1, 11A:
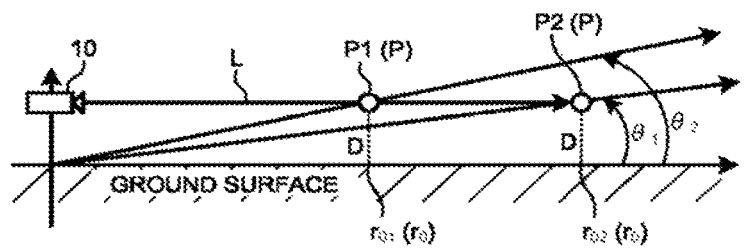
Figures 2, 11A:
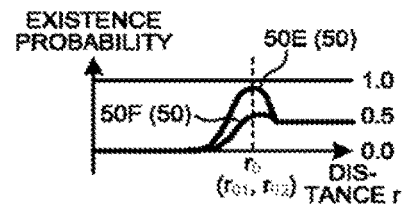

FIG. 11A-2 illustrates models 50 (a model 50E and a model 50F) illustrating two types of existence probabilities calculated using a corresponding one of two types of detection points P (a detection point P1, a detection point P2) located at different distances $r_0$ from the mobile object 10. As illustrated in FIG. 11A-1, assume a case where the distance $r_0$ of the detection point P1 closest to the mobile object 10 is $r_{01}$ and a case where the distance $r_0$ of the detection point P closest to the mobile object 10 is $r_{02}$, for example. Note that the distance $r_{01}$<distance $r_{02}$ is assumed. Furthermore, assume that the first distances D which are the heights of these detection points P (the detection point P1 and the detection point P2) from the ground surface are the same.

In a case where the detection point P closest to the mobile object 10 is the detection point P1, the calculation unit 20E calculates the model 50E representing the existence probabilities illustrated in FIG. 11A-2 by performing the above processing. In addition, in a case where the detection point P closest to the mobile object 10 is the detection point P2, the calculation unit 20E calculates the model 50F representing the existence probabilities illustrated in FIG. 11A-2 by performing the above processing.

By using the above equations (4) to (8) in this way, the calculation unit 20E calculates a lower existence probability for the detection point P which exists in the closest position to the mobile object 10 as the distance $r_0$ of the detection point P is longer.

In addition, it can also be said that the calculation unit 20E can calculate the existence probability which corresponds to the angle $\theta(\theta_1, \theta_2)$ of the detection point P to the ground surface with a point of intersection between a point immediately below the mobile object 10 and the ground surface as the origin by calculating the existence probability using the above equations (4) to (8). The detection point P is the one which exists in the closest position to the mobile object 10. That is, the larger the angle $\theta$, the higher the calculation unit 20E calculates the existence probability for the detection point P.

Furthermore, the calculation unit 20E calculates, for each angular direction $\phi$, the existence probability of "0.0" of the obstacle toward the detection point P located at the closest distance $r_0$ from the position of the mobile object 10 in the corresponding angular direction $\phi$ by using the above equations (4) to (8). In approaching the detection point P at the distance $r_0$, the calculation unit 20E changes the existence probability toward the existence probability of the detection point P at the distance $r_0$. Then, the calculation unit 20E calculates the intermediate value of "0.5", which is an "unknown region", as the existence probability for a region B' at the distance r farther from the mobile object 10 than the distance $r_0$.

Note that while the mobile object 10 is traveling, there are some cases where the optical axis L of the external sensor 10B is oriented in a direction intersecting the ground surface. Even in such cases, the calculation unit 20E can calculate the existence probability according to the conditions of the above-described first distance and second distance regardless of the orientation of the optical axis of the external sensor 10B by calculating the existence probability using the above equations (4) to (8).

Figures 1, 11B:
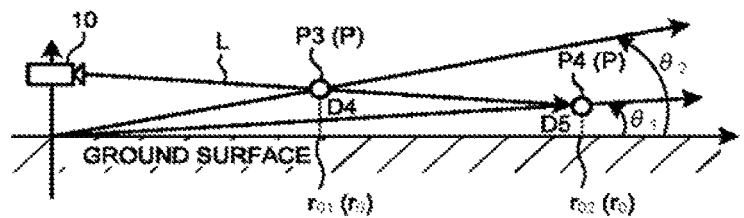
Figures 2, 11B:
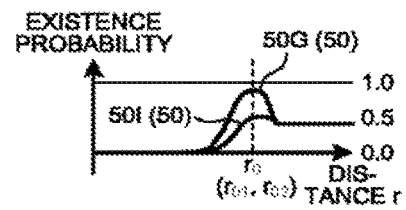

For example, a description will be given with reference to FIG. 11B-2. A model 50G in FIG. 11B-2 is a model 50 illustrating the existence probabilities in a certain angular direction ϕ for a case where the first distance (the height from the ground surface) of a detection point P3 closest to the mobile object 10 is D4 and the distance $r_0$ is a distance $r_{01}$ (see FIG. 11B-1). In addition, a model 50I in FIG. 11B-2 is a model 50 illustrating the existence probabilities in a certain angular direction ϕ for a case where the first distance (the height from the ground surface) of a detection point P4 closest to the mobile object 10 is D5 (where D4>D5) and the distance $r_0$ is a distance $r_{02}$ (see FIG. 11B-1). Note that the illustrated relationship is $r_{01} < r_{02}$.

Then, the calculation unit 20E calculates the existence probability for the detection point P by using the above equations (4) to (8). The existence probability is lower as the first distance D of the detection point P which exists in the closest position to the mobile object 10 is shorter, and is lower as the second distance $r_0$ of the detection point P which exists in the closest position to the mobile object 10 is longer.

By calculating the existence probability using the above equations (4) to (8), therefore, the calculation unit 20E can calculate the existence probability according to the conditions of the above-described first distance and second distance regardless of the orientation of the optical axis of the external sensor 10B.

Note that there are some cases where the mobile object 10 travels on the ground surface inclined with respect to the mobile object 10. Even in such cases where the ground surface is inclined with respect to the mobile object 10, the calculation unit 20E can calculate the existence probability according to the conditions of the above-described first distance and second distance regardless of the degree of inclination of the ground surface by calculating the existence probability using the above equations (4) to (8).

For example, a description will be given with reference to FIG. 11C-2 and FIG. 11D-2.

Figures 1, 11C:
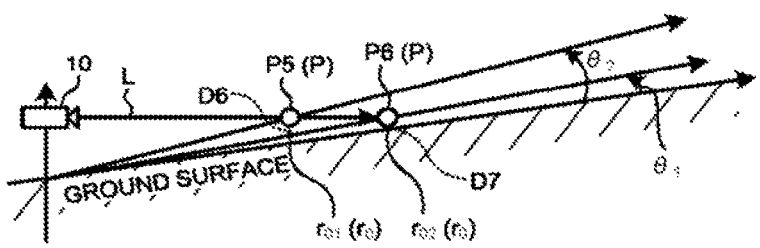
Figures 2, 11C:
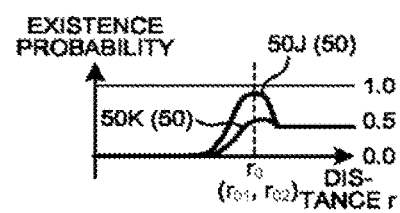

A model 50J in FIG. 11C-2 is a model 50 illustrating the existence probabilities for a case where the first distance (the height from the ground surface) of a detection point P5 closest to the mobile object 10 is D6 and the distance $r_0$ is a distance $r_{01}$ (see FIG. 11C-1). In addition, a model 50K in FIG. 11C-2 is a model 50 illustrating the existence probabilities for a case where the first distance (the height from the ground surface) of a detection point P6 closest to the mobile object 10 is D7 (where D6>D7, D7=0) and the distance $r_0$ is a distance $r_{02}$ (see FIG. 11C-1). Note that the illustrated relationship is $r_{01} < r_{02}$.

Figures 1, 11D:
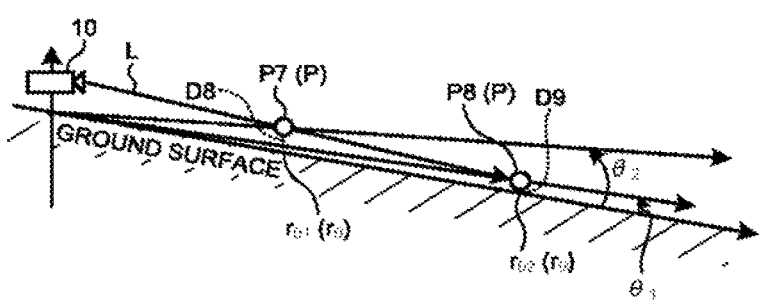
Figures 2, 11D:
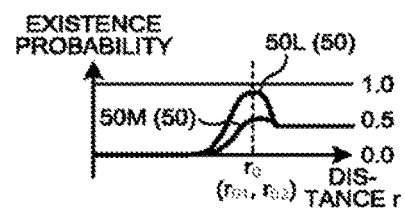

A model 50L in FIG. 11D-2 is a model 50 illustrating the existence probabilities for a case where the first distance (the height from the ground surface) of a detection point P7 closest to the mobile object 10 is D8 and the distance $r_0$ is a distance $r_{01}$ (see FIG. 11D-1). In addition, a model 50M in FIG. 11D-2 is a model 50 illustrating the existence probabilities for a case where the first distance (the height from the ground surface) of a detection point P8 closest to the mobile object 10 is D9 (where D8>D9) and the distance $r_0$ is a distance $r_{02}$ (see FIG. 11D-1). Note that the illustrated relationship is $r_{01} < r_{02}$.

In this way, the calculation unit 20E calculates, for each angular direction ϕ, the existence probability for the detection point P which exists in the closest position to the mobile object 10 by using the above equations (4) to (8). The existence probability for the detection point P is lower as the first distance (height) of the detection point P is shorter, and is lower as the second distance (distance $r_0$) of the detection point P is longer. In addition, the calculation unit 20E also calculates the existence probabilities of obstacles for the regions B' at the distances r other than the distance $r_0$ by using the above equations (4) and (5).

Therefore, even in a case where the ground surface is inclined with respect to the mobile object 10, the calculation unit 20E can calculate the existence probability according to the conditions of the above-described first distance and second distance regardless of the degree of inclination of the ground surface.

The description will continue, returning to FIG. 2. As described above, the calculation unit 20E calculates the existence probabilities of obstacles for respective regions B'. That is, the calculation unit 20E calculates the existence probability of an obstacle for each of the regions B' by the above equations, using the distance r of the corresponding region B' from the mobile object 10 as well as the height (first distance), from the ground surface, of the closest detection point P in the corresponding angular direction ϕ with the mobile object 10 as a reference and the distance $r_0$ (second distance) of this detection point P from the mobile object 10.

Figure 12:
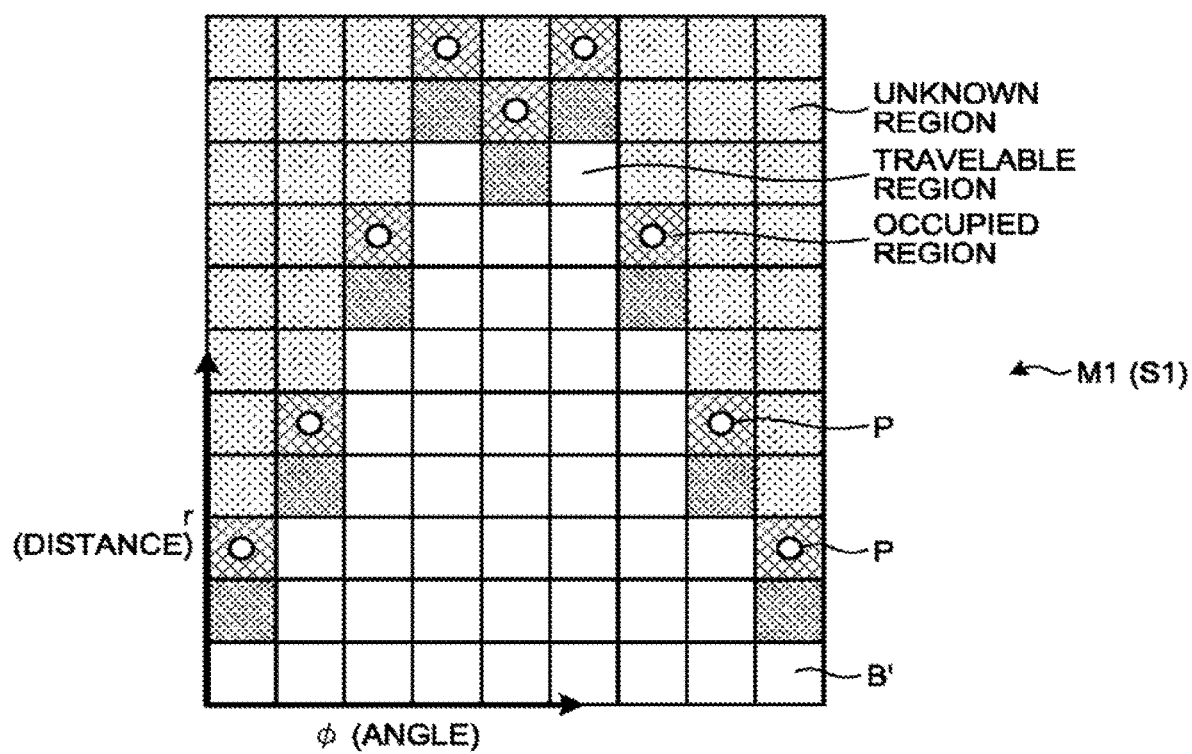
FIG. 12 is a schematic diagram illustrating existence probabilities.

FIG. 12 is a schematic diagram illustrating an example of a polar coordinate map M1. The polar coordinate map M1 represents the existence probability of an obstacle calculated by the calculation unit 20E for each of the regions B' in the polar coordinate space S1. In FIG. 12, the lateral direction (horizontal direction) indicates the angular direction ϕ with the mobile object 10 as the origin in the polar coordinate space S1, and the longitudinal direction (vertical direction) indicates the distance r from the mobile object 10.

FIG. 12 is an example where the polar coordinate space S1 in front of the traveling direction of the mobile object 10 is divided in the angular direction ϕ every 20° (nine divisions). The polar coordinate map M1 illustrated in FIG. 12 can be obtained by the calculation unit 20E calculating the existence probabilities for each angular direction ϕ using the method described above, for example.

Subsequently, the calculation unit 20E converts the polar coordinate map M1 into an orthogonal coordinate space.

Figure 13:
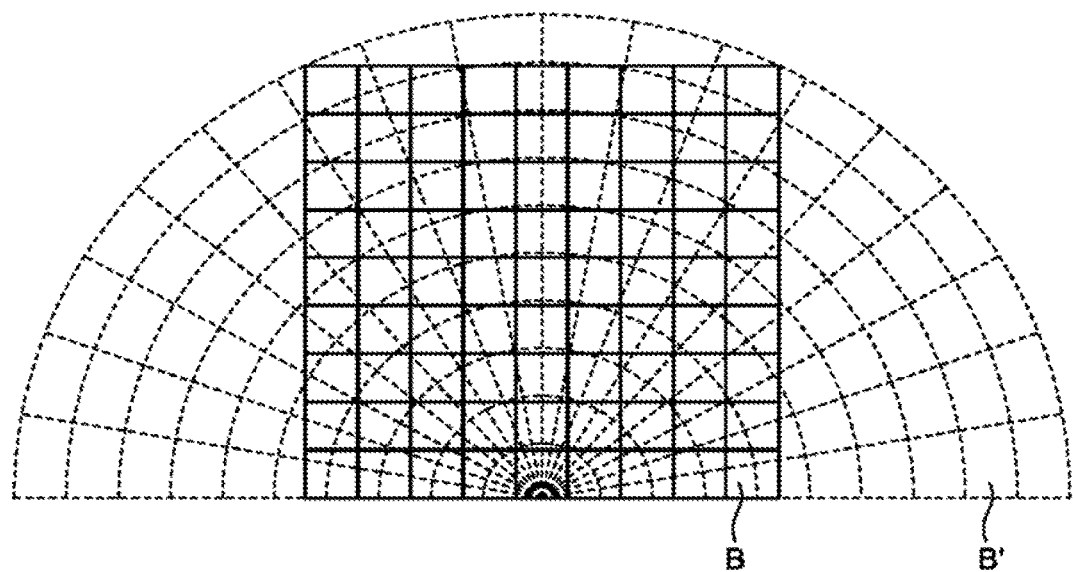
FIG. 13 is a diagram illustrating a relationship between regions in the polar coordinate space and partitioned regions in an orthogonal coordinate space, the relationship being illustrated in the orthogonal coordinate space.

FIG. 13 is a diagram illustrating a relationship between the regions B' in the polar coordinate space and the partitioned regions B in the orthogonal coordinate space. The relationship is illustrated in the orthogonal coordinate space. The regions indicated by the solid lines in FIG. 13 are the partitioned regions B divided into rectangles in the orthogonal coordinate space, and the regions indicated by the broken lines are the regions obtained by converting the regions B' divided into rectangles in the polar coordinate space into the orthogonal coordinate space.

For each partitioned region B in the orthogonal coordinate space, the calculation unit 20E sets the existence probability of an obstacle in the closest region B', among the regions B' rectangularly divided in the polar coordinate space, as the existence probability of an obstacle in the corresponding partitioned region B in the positional relationship as illustrated in FIG. 13. For example, the calculation unit 20E may perform this setting using a nearest-neighbor method.

By using a bilinear method, furthermore, the calculation unit 20E interpolates, for each partitioned region B in the orthogonal coordinate space, the existence probability of an obstacle in the corresponding neighboring region B' among the regions B' rectangularly divided in the polar coordinate space. The existence probabilities of the obstacles in the partitioned regions B may be set in this way.

Note that these methods are examples of coordinate conversion from the polar coordinate space into the orthogonal coordinate space, and are not limited to these methods.

Figure 14:
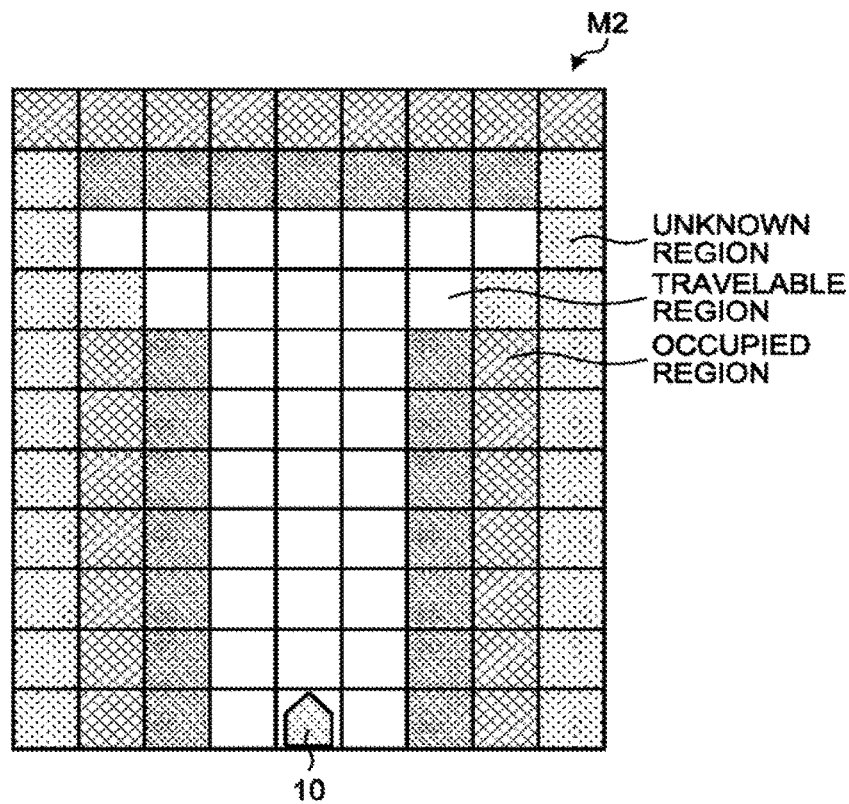
FIG. 14 is schematic diagram illustrating an orthogonal coordinate map.

FIG. 14 is a schematic diagram illustrating an example of an orthogonal coordinate map M2. FIG. 14 is a result obtained by converting the polar coordinate map M1 illustrated in FIG. 12 into the orthogonal coordinate map M2 which is in the orthogonal coordinate space.

Note that with respect to the scene in FIG. 7, the existence probabilities of obstacles in the regions corresponding to the fences at the sides of the road on which the mobile object 10 travels are set to the maximum value or a value close to the maximum value in the orthogonal coordinate space (indicated by "grid-like hatching with diagonal lines" in FIG. 14). Furthermore, the existence probabilities of obstacles in the partitioned regions B further back than these regions are set to the intermediate value (indicated in "gray" in FIG. 14), and the state is unknown. Furthermore, the partitioned regions B existing between the regions where the obstacles exist and the mobile object 10 are set to the existence probabilities (indicated in a color between "grid-like hatching with diagonal lines" and "white" and "gray" in FIG. 14) that change toward the regions where the obstacles exist from the existence probabilities of obstacles of the minimum value (indicated in "white" in FIG. 14).

Then, the calculation unit 20E outputs this orthogonal coordinate map M2 to the output control unit 20F as existence probability information indicating the existence probabilities of obstacles.

Note that the calculation unit 20E may integrate the calculated existence probability information of obstacles and the existence probability information of obstacles calculated in the past in time series.

Figure 15:
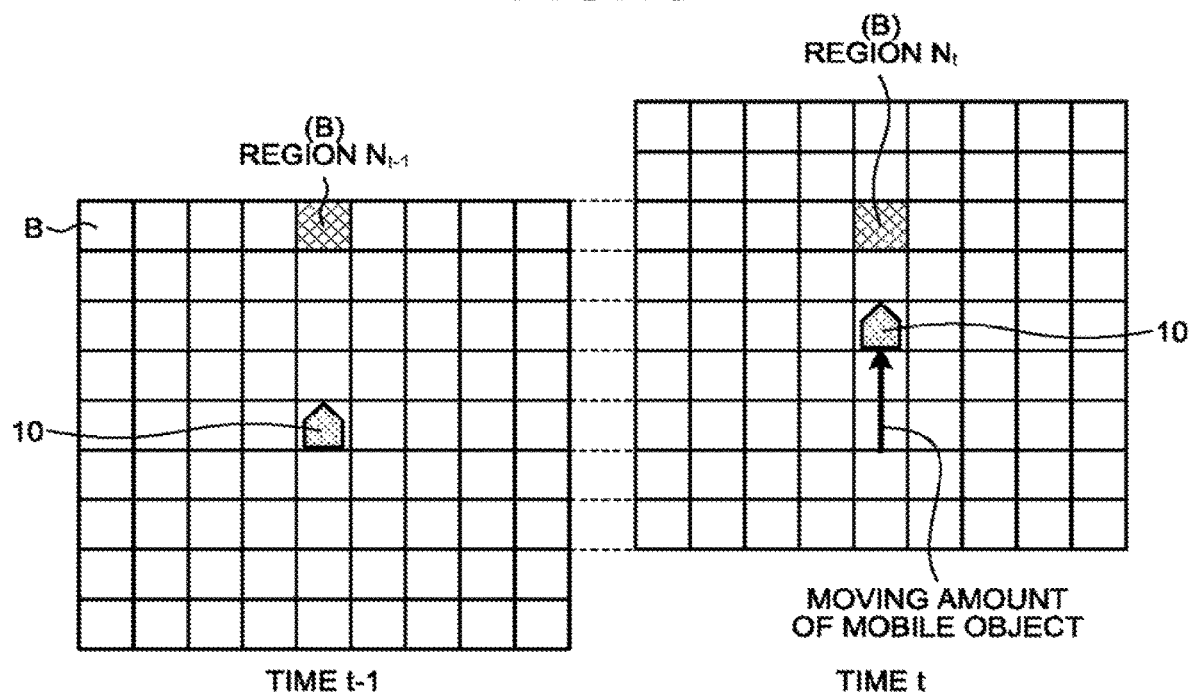
FIG. 15 is an explanatory diagram of existence probabilities integrated in time series.

FIG. 15 is an explanatory diagram of the existence probabilities integrated in time series. FIG. 15 illustrates a plurality of partitioned regions B obtained by dividing a surrounding space centered on the mobile object 10 for each of time t-1 and time t.

A region $N_{t-1}$ which is a partitioned region B at the time t-1 and a region $N_t$ which is a partitioned region B at the time t are different in terms of the relative position from the mobile object 10 at each time. However, these of the region $N_{t-1}$ and the region $N_t$ which is the partitioned region B at the time t indicate the same position in a world coordinate space.

The calculation unit 20E calculates the moving amount of the mobile object 10 between the time t and the time t-1 from the self position and attitude information. The time t-1 is the time immediately before the time t. Then, the calculation unit 20E obtains the partitioned regions B at the time t-1 corresponding to the respective partitioned regions B at the time t on the basis of the moving amount of the mobile object 10. In the example of FIG. 15, the region $N_{t-1}$ is obtained as the region (partitioned region B) at the time t-1 corresponding to the region $N_t$ at the time t. Then, the calculation unit 20E integrates the existence probability of an obstacle for the region $N_t$ (the existence probability of the obstacle calculated on the basis of the current position information) and the existence probability of an obstacle calculated in the past for the region $N_{t-1}$. For this integration, Bayes's theorem indicated in the following equation (9) may be used, for example.

$$\frac{p(m_i \mid z_1, \ldots, z_t)}{1 - p(m_i \mid z_1, \ldots, z_t)} = \frac{p(m_i \mid z_t)}{1 - p(m_i \mid z_t)} \cdot \frac{p(m_i \mid z_1, \ldots, z_{t-1})}{1 - p(m_i \mid z_1, \ldots, z_{t-1})} \quad (9)$$

Note that in the equation (9), $p(m_i|z_t)$ indicates the existence probability of an obstacle based on the current position information, $p(m_i|z_1, \ldots, z_{t-1})$ indicates the existence probability of an obstacle based on the position information in the past, and $p(m_i|z_1, \ldots, z_t)$ indicates the existence probability of an obstacle based on the position information up to the present.

By integrating the existence probabilities of obstacles for the respective partitioned regions B in time series, the calculation unit 20E can robustly calculate the existence probabilities of obstacles even in a case where the sensor observes a value including a noise at any timing, for example.

The description will continue, returning to FIG. 2. The calculation unit 20E outputs the calculated existence probability information indicating the existence probabilities of obstacles to the output control unit 20F. In the present embodiment, the calculation unit 20E outputs the orthogonal coordinate map M2 to the output control unit 20F. The orthogonal coordinate map M2 indicates the existence probability of an obstacle for each of the partitioned regions B.

The output control unit 20F outputs the existence probability information. In the present embodiment, the orthogonal coordinate map M2 indicating the existence probability information is output to at least one of the output unit 10A and the power control unit 10G.

The output control unit 20F displays the existence probability information on the display 10E. In the present embodiment, the output control unit 20F displays a display screen including the existence probability information on the display 10E.

Figure 16:
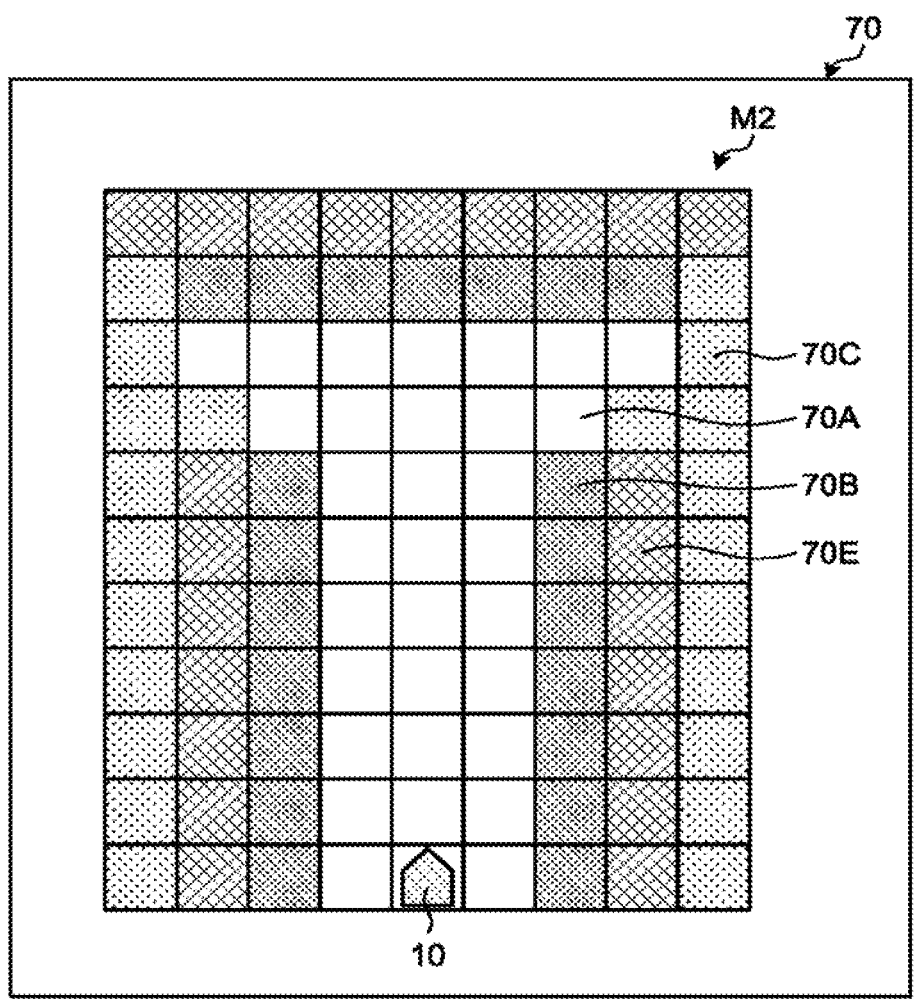
FIG. 16 is a schematic diagram illustrating a display screen.

FIG. 16 is a schematic diagram illustrating an example of a display screen 70. The display screen 70 includes the orthogonal coordinate map M2 calculated by the calculation unit 20E. The orthogonal coordinate map M2 in the display screen 70 is the same as the orthogonal coordinate map M2 illustrated in FIG. 14. Note that in the display screen 70, the existence probabilities of obstacles in the regions corresponding to the fences at the sides of the road on which the mobile object 10 travels are indicated as regions 70E. Furthermore, the existence probabilities of obstacles further back than these regions are indicated as regions 70C to which the intermediate value is set. Furthermore, the partitioned regions B existing between regions where the obstacles exist and the mobile object 10 are indicated as regions 70A and regions 70B. The regions 70A are where the existence probabilities of obstacles indicate the minimum value. The regions 70B indicate the existence probabilities that change from the regions 70A toward the regions where the obstacles exist. Therefore, the user can easily recognize the existence probabilities of obstacles by confirming the display screen 70.

The description will continue, returning to FIG. 2. Furthermore, the output control unit 20F may control the display 10E and the speaker 10F so as to output a sound and light indicating the existence probability information. Furthermore, the output control unit 20F may transmit the existence probability information to the external apparatus via the communication unit 10D.

Furthermore, the output control unit 20F may output the existence probability information to the power control unit 10G.

In this case, the power control unit 10G controls the power unit 10H according to the existence probability information received from the output control unit 20F. For example, the power control unit 10G may generate a power control signal for controlling the power unit 10H according to the existence probability information and control the power unit 10H. The power control signal is a control signal for controlling the drive unit that drives the traveling of the mobile object 10 in the power unit 10H. For example, the power control unit 10G controls steering, engine, and the like, of the mobile object 10 such that the mobile object 10 travels in regions of a real space corresponding to the partitioned regions B whose existence probabilities are indicated as travelable regions by the existence probability information.

Figure 17:
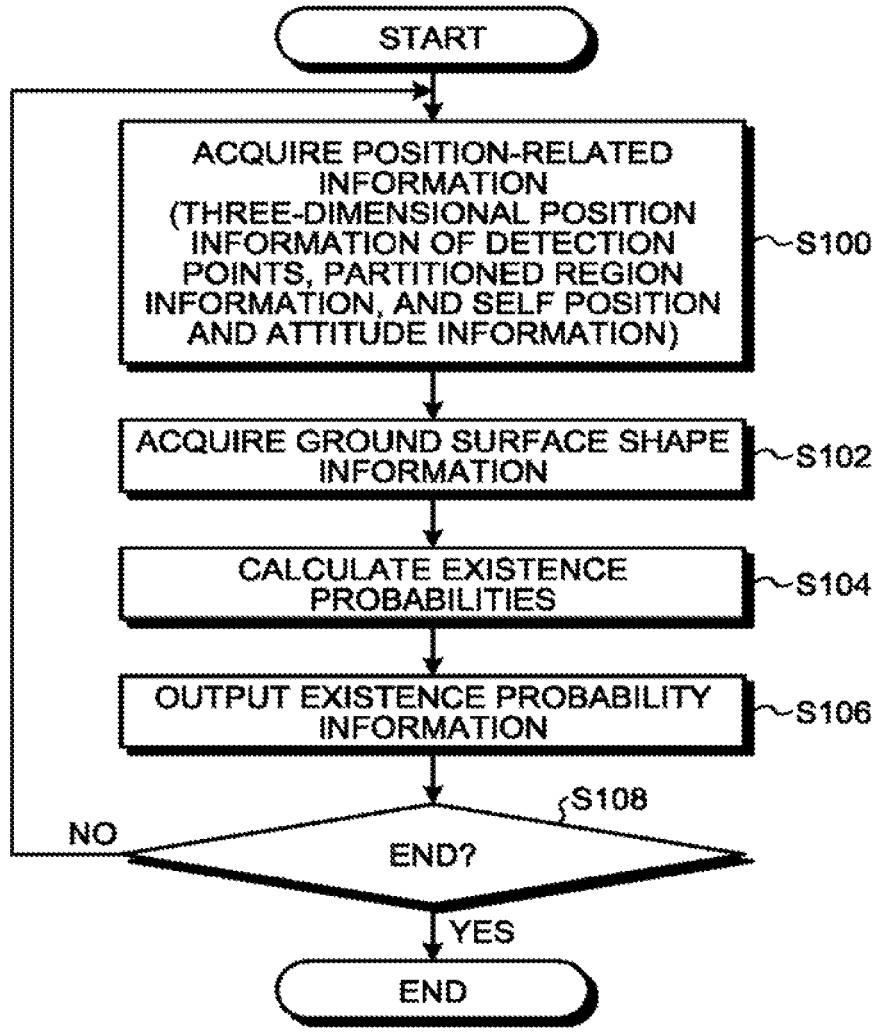
FIG. 17 is a flowchart illustrating an example of a procedure of information processing.

Subsequently, an example of a procedure of information processing executed by the information processing apparatus 20 will be described. FIG. 17 is a flowchart illustrating the example of the procedure of the information processing.

First, the position acquisition unit 20C acquires position-related information (step S100). Subsequently, the shape acquisition unit 20D acquires ground surface shape information 36 indicating the shape of the ground surface (step S102).

Subsequently, the calculation unit 20E calculates the existence probabilities of obstacles according to the first distances and the second distances of detection points P on the basis of the position-related information acquired in step S100 and the ground surface shape information 36 acquired in step S102 (step S104).

Subsequently, the output control unit 20F outputs existence probability information calculated in step S104 (step S106). In the present embodiment, the orthogonal coordinate map M2 indicating the existence probability information is output to at least one of the output unit 10A and the power control unit 10G.

Subsequently, the processing unit 20A determines whether to end the processing (step S108). When the determination in step S108 is negative (step S108: No), the processing returns to step S100. On the other hand, when the determination in step S108 is positive (step S108: Yes), this routine ends.

As described above, the information processing apparatus 20 according to the present embodiment includes the position acquisition unit 20C, the shape acquisition unit 20D, and the calculation unit 20E. The position acquisition unit 20C acquires three-dimensional position information of detection points P. The shape acquisition unit 20D acquires target surface shape information (ground surface shape information 36) indicating the shape of the target surface (ground surface). The calculation unit 20E calculates state information of objects (existence probabilities of obstacles) according to the first distances of the detection points P from the ground surface on the basis of the three-dimensional position information and the target surface shape information (ground surface shape information 36).

In this way, the information processing apparatus 20 according to the present embodiment calculates the existence probabilities of obstacles (state information of objects) according to the distances of the detection points P from the ground surface (target surface). Accordingly, it is possible to suppress the occurrence that a travelable region such as a ground surface is erroneously recognized as an obstacle. More specifically, even in a case where a position indicated by the three-dimensional position information of a detection point P indicates a target surface such as a ground surface, it is possible to suppress the occurrence that the region including the detection point P is recognized as an object such as an obstacle.

Therefore, the information processing apparatus 20 according to the present embodiment can improve the reliability of object detection.

Furthermore, the information processing apparatus 20 according to the present embodiment derives the first distances of the detection points P from the ground surface on the basis of the ground surface shape information 36. Therefore, it is possible to suppress the influence of estimation errors of the ground surface shape, thereby improving the reliability of the object detection.

First Modification

Note that in the above embodiment, the position acquisition unit 20C acquires the three-dimensional position information of detection points P from the external sensor 10B, and the shape acquisition unit 20D generates the ground surface shape information 36 using this three-dimensional position information.

However, the position acquisition unit 20C and the shape acquisition unit 20D may acquire the three-dimensional position information of the detection points P using different external sensors 10B.

In this case, a first external sensor 10J and a second external sensor 10K may be included as the external sensors 10B as illustrated in FIG. 2. The first external sensor 10J and the second external sensor 10K are similar to the external sensor 10B described above. Note that the first external sensor 10J and the second external sensor 10K may be physically different sensors. Specifically, the first external sensor 10J and the second external sensor 10K just need to be mutually different types of the external sensors 10B.

For example, a photographing apparatus (a monocular camera or a stereo camera) is used as the first external sensor 10J, and a laser imaging detection and ranging (LIDAR) sensor such as a two-dimensional LIDAR sensor or a three-dimensional LIDAR sensor mounted parallel to a horizontal plane is used as the second external sensor 10K.

Then, the position acquisition unit 20C acquires the three-dimensional position information of detection points P from the second external sensor 10K such as the LIDAR sensor and outputs the three-dimensional position information to the calculation unit 20E. Furthermore, the shape acquisition unit 20D may acquire the three-dimensional position information of the detection points P from the first external sensor 10J such as a camera and generate ground surface shape information 36. Then, the shape acquisition unit 20D may output the ground surface shape information 36 generated using the three-dimensional position information of the detection points P acquired from the first external sensor 10J to the calculation unit 20E. The processing of the calculation unit 20E and the output control unit 20F are similar to those in the above embodiment.

Note that the shape acquisition unit 20D may acquire the three-dimensional position information of the detection points P from the second external sensor 10K such as the LIDAR sensor and generate the ground surface shape information 36. Then, the position acquisition unit 20C may acquire the three-dimensional position information of the detection points P from the first external sensor 10J such as a camera and output the three-dimensional position information to the calculation unit 20E.

Note that in a case where second external sensor 10K is the two-dimensional LIDAR, the optical axis of the LIDAR may be horizontal to the traveling direction as illustrated in FIG. 11A-1. Furthermore, the optical axis of the LIDAR may be inclined to the traveling direction as illustrated in FIG. 11B-1. Furthermore, even in a case where the second external sensor 10K is the three-dimensional LIDAR capable of measuring the distance information of a plurality of lines, the information processing apparatus 20 can also recognize a surrounding environment on the basis of the existence probabilities of obstacles calculated for the distance information of each line.

In the present modification, the position acquisition unit 20C and the shape acquisition unit 20D acquire the three-dimensional position information of the detection points P using the different external sensors 10B in this way. In the present modification, therefore, even for sensor information that is difficult to estimate the ground surface shape with a sensor alone such as one-line LIDAR, the information processing apparatus 20 can calculate the existence probabilities of obstacles by using the ground surface shape information estimated from another sensor. In the present modification, furthermore, the information processing apparatus 20 can suppress erroneous detection of part of the ground surface such as a road as an obstacle, and suppress undetected obstacles.

Second Modification

Note that in the above embodiment, the position acquisition unit 20C acquires the three-dimensional position information of the detection points P from the external sensor 10B mounted in the mobile object 10. Furthermore, the shape acquisition unit 20D acquires the ground surface shape information 36 on the basis of the three-dimensional position information acquired from the external sensor 10B mounted in the mobile object 10.

However, at least one of the position acquisition unit 20C and the shape acquisition unit 20D may acquire the three-dimensional position information of the detection points P from an external apparatus. In this case, at least one of the position acquisition unit 20C and the shape acquisition unit 20D may acquire the three-dimensional position information of the detection points P from the external apparatus via the communication unit 10D.

Furthermore, the shape acquisition unit 20D may acquire the ground surface shape information 36 by receiving the ground surface shape information 36 from the external apparatus via the communication unit 10D.

Figure 18:
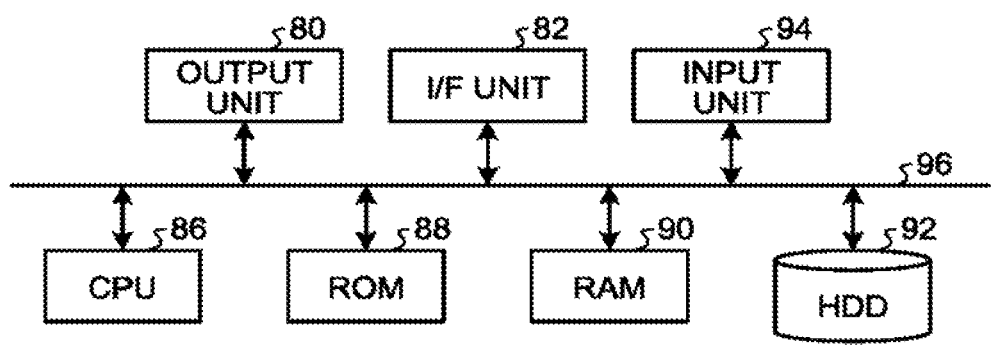
FIG. 18 is a hardware configuration diagram.

Next, an example of a hardware configuration of the information processing apparatus 20 according to the above embodiment will be described. FIG. 18 is the example of the hardware configuration of the information processing apparatus 20 according to the above embodiment.

The information processing apparatus 20 according to the above embodiment includes a control apparatus, storage apparatuses, an I/F unit 82, an output unit 80, an input unit 94, and a bus 96, and has a hardware configuration using a typical computer. The control apparatus is a CPU 86 or the like. The storage apparatuses are a read only memory (ROM) 88, a random access memory (RAM) 90, a hard disk drive (HDD) 92, and the like. The I/F unit 82 serves as an interface with various devices. The output unit 80 outputs various kinds of information such as output information. The input unit 94 receives user operations. The bus 96 connects above units.

In the information processing apparatus 20 according to the above embodiment, the CPU 86 reads a program from the ROM 88 onto the RAM 90 and executes the program so that the above units are performed on the computer.

Note that the program for executing the above processing to be executed by the information processing apparatus 20 according to the above embodiment may be stored in the HDD 92. Furthermore, the program for executing the above processing to be executed by the information processing apparatus 20 according to the above embodiment may be incorporated preliminarily and provided in the ROM 88.

Furthermore, the program for executing the above processing to be executed by the information processing apparatus 20 according to the above embodiment may be stored and provided in the form of an installable or executable file as a computer program product in a computer-readable storage medium such as a compact disc read only memory (CD-ROM), a compact disc recordable (CD-R), a memory card, a digital versatile disk (DVD), or a flexible disk (FD). Furthermore, the program for executing the above processing to be executed by the information processing apparatus 20 according to the above embodiment may be stored on a computer connected to a network such as the Internet, and provided by being downloaded via the network. Furthermore, the program for executing the above processing to be executed by the information processing apparatus 20 according to the above embodiment may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An information processing apparatus comprising:
a memory;
processing circuitry configured to
acquire three-dimensional position information of a plurality of detection points;
acquire target surface shape information indicating a shape of a target surface; and
calculate state information of an object according to one respective first distance of a respective one of the plurality of detection points from the target surface on the basis of the three-dimensional position information and the target surface shape information,
wherein the calculating calculates the state information which is lower when the first distance is shorter, and
wherein the processing circuitry is configured to calculate the state information which is lower as respective of second distances between positions of respective of ones of the plurality of detection points indicated by the three-dimensional position information and a reference position is longer.
2. The information processing apparatus according to claim 1, wherein the state information indicates an probability that the object exists.

3. The information processing apparatus according to claim 1, wherein in a case where the first distance is 0 or less, the processing circuitry is configured to calculate an intermediate value indicating that a state is unknown as the state information.

4. The information processing apparatus according to claim 1, wherein the processing circuitry is configured to calculate the state information according to the respective first distance of the detection point among the plurality of detection points closest to a reference position for an angular direction from the reference position in a polar coordinate space.

5. The information processing apparatus according to claim 4, wherein
the processing circuitry is configured to calculate:
the state information of the plurality of detection points according to the respective first distance of the detection point among the plurality of detection points closest to the reference position for the angular direction from the reference position in the polar coordinate space; and
a model indicating a change according to a distance from the reference position and the state information of the closest detection point along a line extending in the angular direction from the reference position in the polar coordinate space.

6. The information processing apparatus according to claim 1, wherein
the processing circuitry is configured to acquire the target surface shape information according to distribution of the plurality of the detection points.

7. The information processing apparatus according to claim 1,
wherein the processing circuitry is configured to acquire the three-dimensional position information of the plurality of detection points from a first external sensor, and
acquire the target surface shape information by generating the target surface shape information according to the three-dimensional position information of the plurality of detection points detected by a second external sensor.

8. The information processing apparatus according to claim 7,
wherein the processing circuitry is configured to acquire the three-dimensional position information from an external apparatus.

9. The information processing apparatus according to claim 1, wherein
the processing circuitry is configured to acquire output the state information.

10. An information processing method comprising:
acquiring three-dimensional position information of a plurality of detection points;
acquiring target surface shape information indicating a shape of a target surface; and
calculating state information of an object according to one respective first distance of a respective one of the plurality of detection points from the target surface on the basis of the three-dimensional position information and the target surface shape information, wherein
the calculating calculates the state information which is lower when the first distance is shorter, and
wherein, in the calculating, lower state information is calculated as respective of second distances between positions of respective of ones of the plurality of detection points indicated by the three-dimensional position information and a reference position is longer.

11. The information processing method according to claim 10, wherein the state information indicates an existence probability of the object.

12. The information processing method according to claim 10, wherein, in the calculating, lower state information is calculated as the first distance is shorter.

13. The information processing method according to claim 10, wherein, in the calculating, in a case where the first distance is 0 or less, an intermediate value is calculated as the state information.

14. The information processing method according to claim 10, wherein, in the calculating, the state information is calculated according to the respective first distance of the detection point among the plurality of detection points closest to a reference position for an angular direction from the reference position in a polar coordinate space.

15. The information processing method according to claim 14, wherein, in the calculating,
the state information of the detection point is calculated according to the respective first distance of the detection point among the plurality of detection points closest to the reference position for the angular direction from the reference position in the polar coordinate space; and
a model is calculated, the model indicating a change according to a distance from the reference position and the state information of the closest detection point along a line extending in the angular direction from the reference position in the polar coordinate space.

16. The information processing method according to claim 10, wherein, in acquiring of the target surface shape information,
the target surface shape information according to distribution of the plurality of the detection points is acquired.

17. The information processing apparatus according to claim 1, wherein
the processing circuitry is further configured to
display, on a display unit, a display screen including the state information of the object.

* * * * *